United States Patent [19]

Eichen et al.

[11] 3,720,948
[45] March 13, 1973

[54] PROCESSING OF COORDINATE VALUES OF POINTS ENTERED IN A GRAPH BOARD OR THE LIKE

[75] Inventors: Howard R. Eichen, Fullerton; Robert H. Paulsen, Placentia, both of Calif.

[73] Assignee: Co-Data Corporation, Fullerton, Calif.

[22] Filed: June 3, 1971

[21] Appl. No.: 149,617

[52] U.S. Cl. ............... 444/1, 235/61 PE, 340/172.5
[51] Int. Cl. .................................................. G06f 15/00
[58] Field of Search ............. 340/172.5, 337; 178/87; 235/61 PE; 444/1; 197/105

[56] References Cited

OTHER PUBLICATIONS

Cameron, S. H. et al. Dialog: A Conversational Programming System with a Graphical Orientation, In Comm. A.C.M. 10(6), pp. 349-357, June 1967, QA76A8c.

Primary Examiner—Malcolm A. Morrison
Assistant Examiner—R. Stephen Dildine, Jr.
Attorney—Smyth, Roston & Pavitt

[57] ABSTRACT

A method of processing coordinate values of points entered in a tablet, by means of a digital data processing facility wherein a first tablet area is operated as alpha numerical keyboard by correlating discrete points entered with keyboard numbers; a second tablet area is operated as a description and encoding board by correlating discrete points entered therein with arbitrarily selected description codes; a third tablet area is operated as a graph board by storing points thereof entered in the third area in spatial relation corresponding to their spatial relation on the graph board; numbers, description codes and graph board points are correlated by means of an algorithm that operates in dependence of the order of entry of points in the first, second and third areas.

23 Claims, 13 Drawing Figures

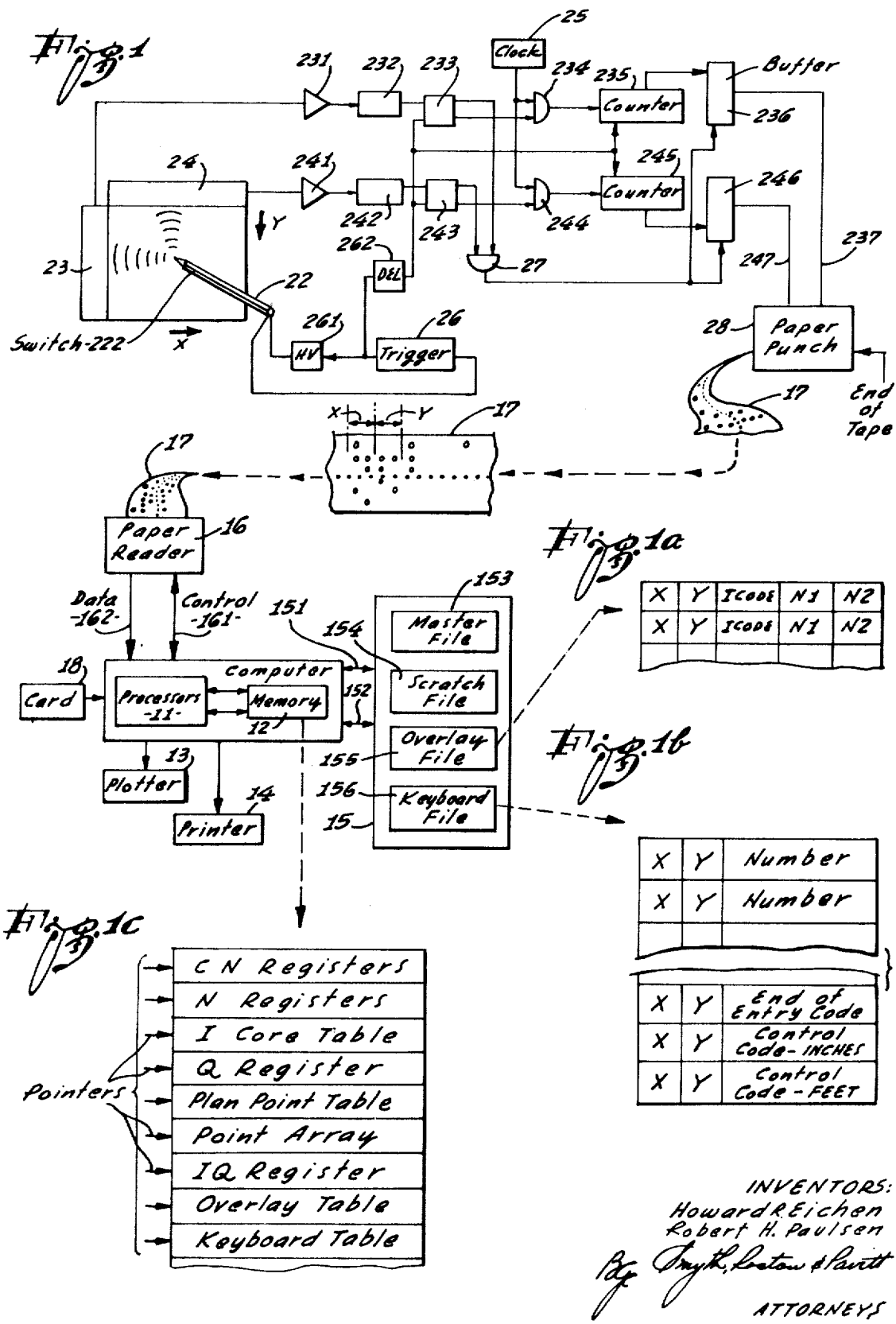

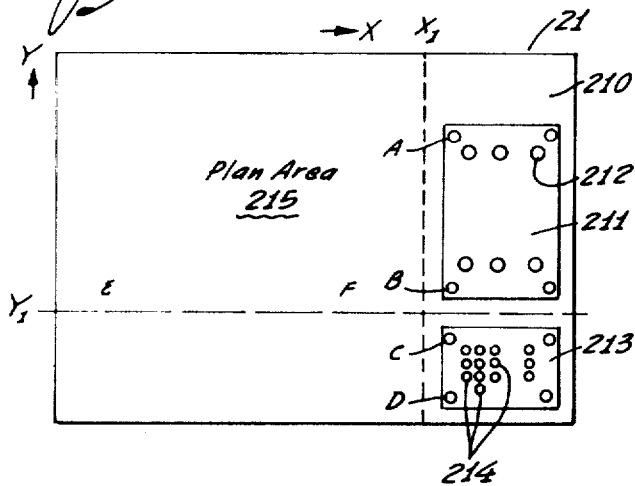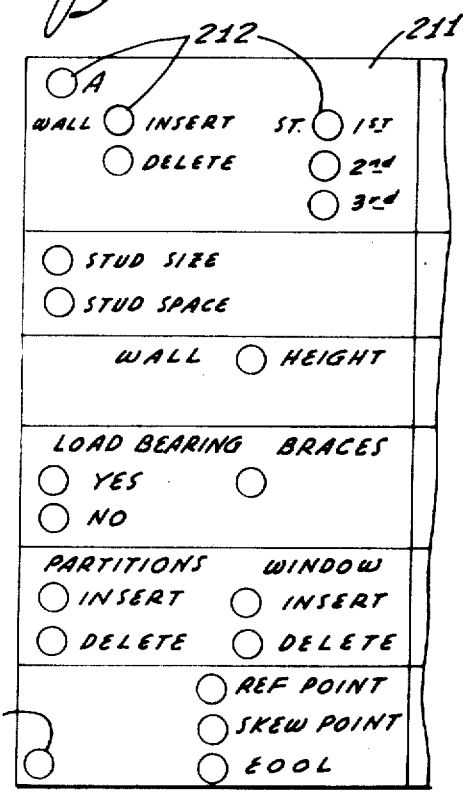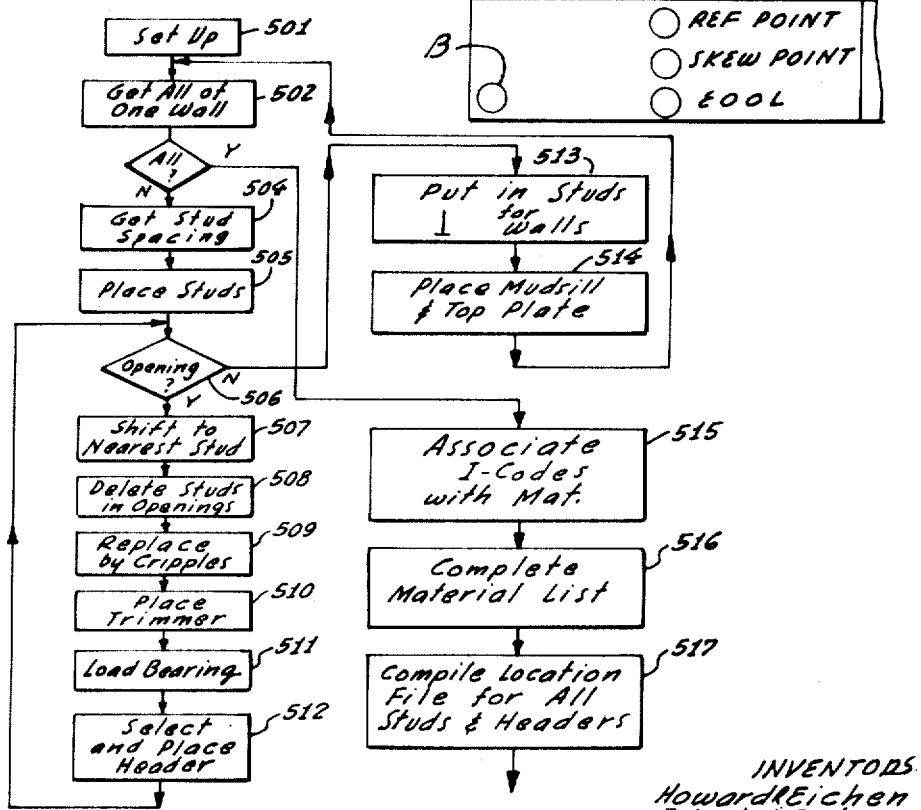

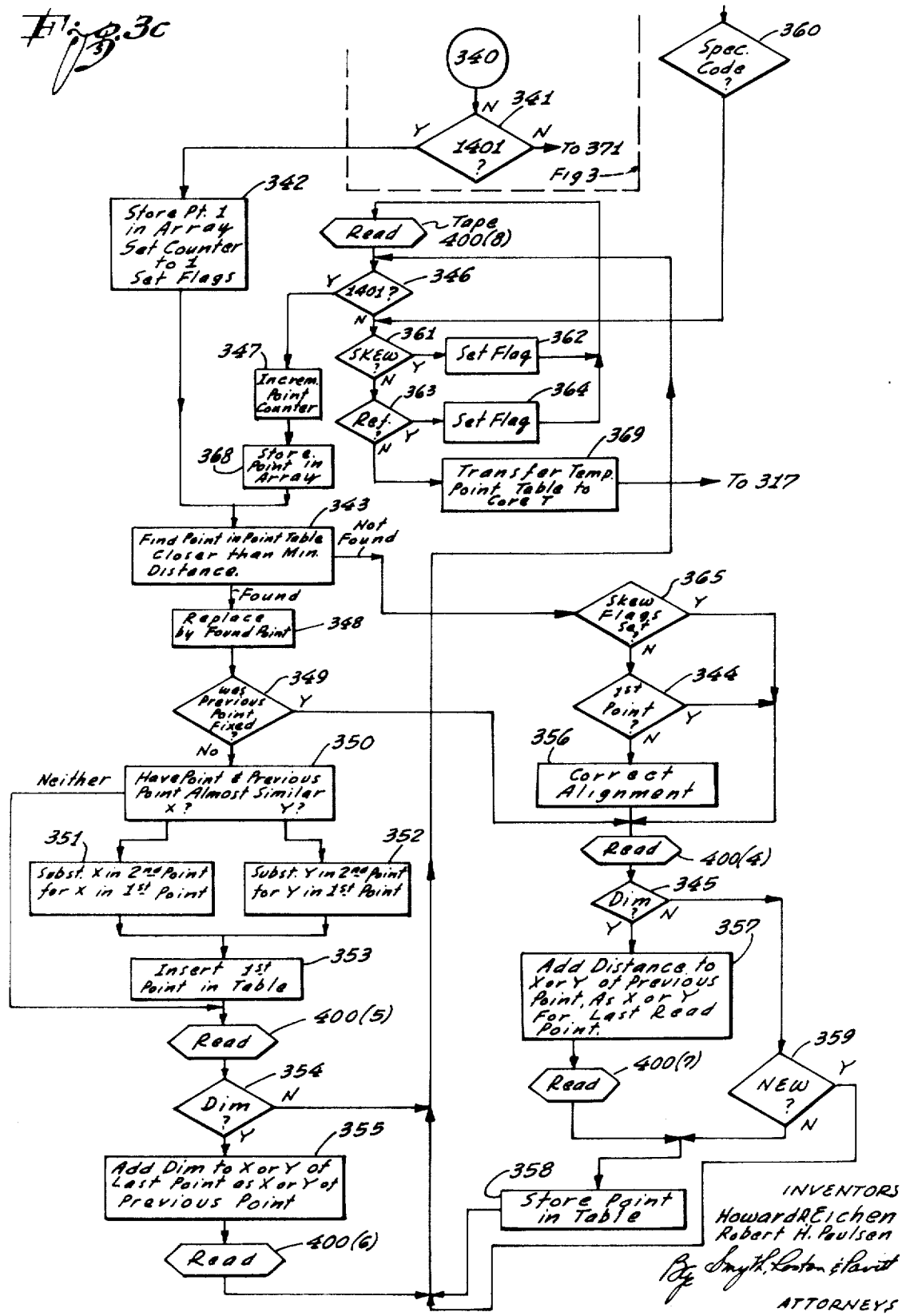

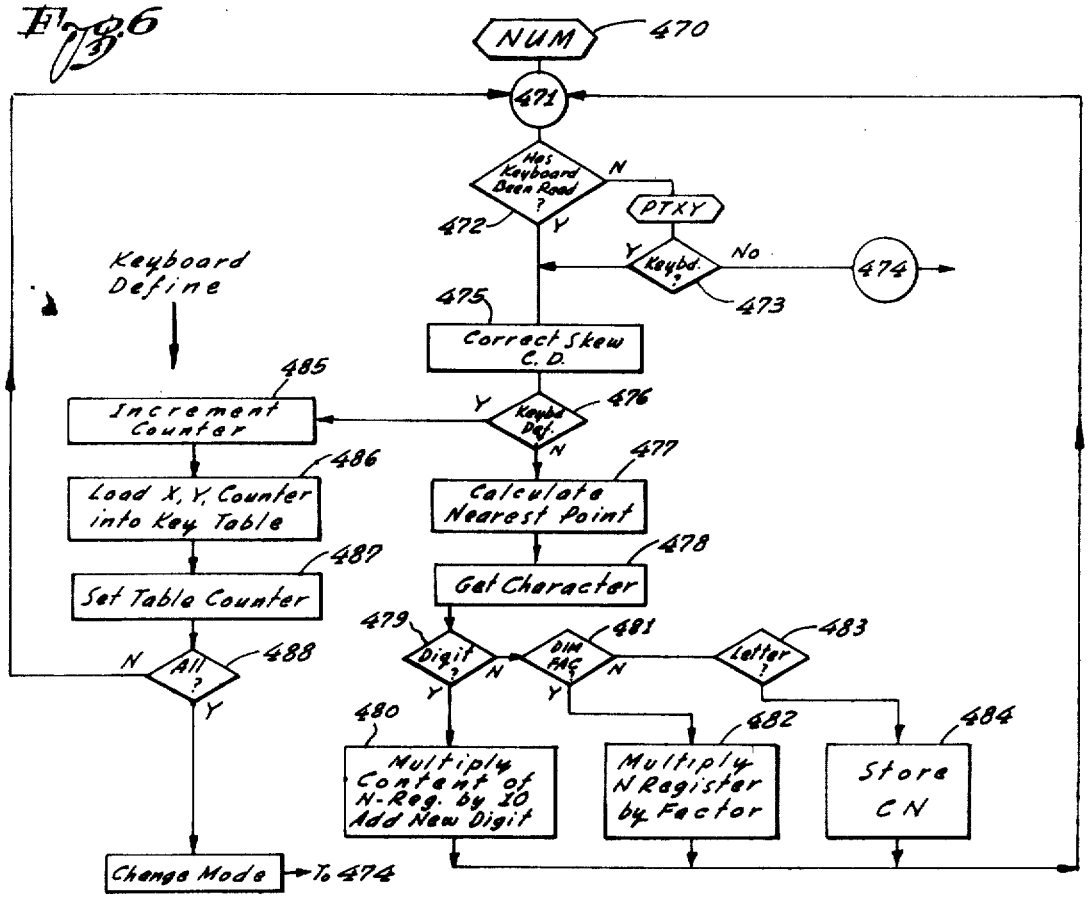
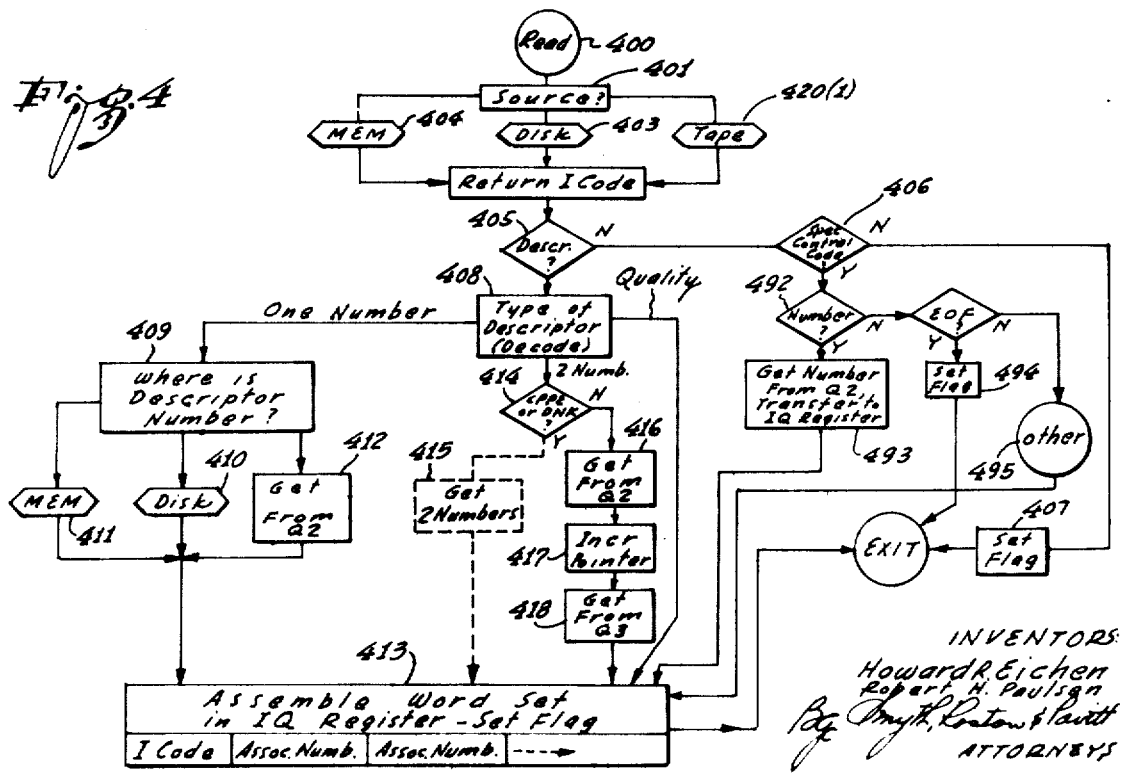

PROCESSING OF COORDINATE VALUES OF POINTS ENTERED IN A GRAPH BOARD OR THE LIKE

The present invention relates to method and system for acquisition of information. More particularly, the invention relates to method and system for processing information produced on basis of a two dimensional digitizer.

Digitizers have been developed in the past using a planar tablet and a pointer; as the pointer points to a particular point on the tablet a pair of X,Y coordinate values are developed and recorded. Such equipment has been used to translate pictorial representation into digital information. The present invention expands the use of such digitizer.

In accordance with the present invention, it is suggested to use encoded overlays on a portion of the tablet, using the remainder as graphic board or plan area for geometric representation.

The overlays are used to qualitatively designate and to quantitatively particularize subject matter illustrated in the plan area. A single tablet area is used, with the digitizer providing only pairs of coordinates of points; subsequent processing interprets these points and provides interrelationship on basis of the relation of such points including their order of presentation. The overlays are to include a keyboard overlay to be placed in a keyboard area of the tablet and to be used for defining "keys" e.g., in form of a pictorial representation of a keyboard. A digital data processing system, such as a stored program, general purpose computer processes the coordinates of any recorded point on the tablet and distinguishes them, first of all, as to the area in which they have been placed (pointed to). The computer contains manifestations in which the coordinate values of a set of points from the keyboard area are about equivalent to the center of delineated "key" and is associated with digital information of the number represented by the "key." Therefore, as the user points to a "key" on the keyboard overlay, a pair of coordinate values are generated, which through associate processing are converted, e.g., into a number.

A program is stored in the computer which associates points of geometric significance in the plan area which have been pointed to, with numerical information that have been "keyed-in," also by use of the same pointer. The user is, thus, enabled to delineate a drawing when placed in the plan area by pointing to line-defining points therein, and to provide quantitative information for scaling, and, most importantly, he may establish distance relation between points at any desired degree of accuracy by means of the "-keyboard." By using the same pointer for both types of inputs, his efficiency is greatly enhanced; he does not need a separate real keyboard. The digitizer itself merely accumulates coordinate pairs of points, pointed to by the pointer. The processor distinguishes the significance of the points and correlates their distinctive interpretation.

Another type of overlay used, to be called descriptive overlay, has delineating "keys" or markings analogous to the "keyboard" overlay, but these markings have still different significance. The descriptive overlays are placed also on the tablet, but in the so called overlay area thereof. Basically, they have qualitative significance with or without implied quantitative significance and are used to define the object or objects delineated in the plan area. A user points to one of these delineated "points" and generates again a pair of coordinate values which the computer associates with particular codes of arbitrarily definiable significance for digitally defining and identifying any object in the plan area, per se identified therein only by points. Within groups of these codes, distinction is made whether additional, descriptive quantitative data are to be included or whether such quantitative values have to be "keyed-in."

Without intending a restriction, the following specific example will be helpful to understand the concept. An architectural drawing may be placed in the plan area of the digitizer tablet, showing floor elevation of a building. A descriptive overlay defines particulars as to the "walls" generally, Thus, if the user points first to a marking "insert wall" in the descriptive overlay and then to two corner points in the plan area, he defines length and location of the wall. Conversely, two points in the plan area are identified as a wall by pointing to a descriptive overlay marking for that purpose prior to entering the points of the plan area.

Actually, the user generates only three different pairs of coordinates, but the computer interprets the first pair, in the descriptive overlay, as defining a "wall" code and the second and third pairs in the plan area are then the end corners of that wall. As part of the initial preparation, a scale has been keyed-in; particularly a particular distance has been delineated by way of two points, and a numerical value has been keyed in as interpretation of that distance. All subsequent coordinate points are calculated with reference to that distance as scale. If subsequent to entering two plan points, the user "keys-in" a number by pointing to the appropriate keyboard overlay "keys," the coordinates of one or both plan points are adjusted to reflect the more accurate digital key-in. Within that wall, two additional points may be entered, and by way of the description overlay they are interpretable as "window." A subsequent keyed-in number may be qualitatively identified by the qualitative overlay as height of that window, etc.

It follows from the foregoing that the user manipulates the pointing instrument over three areas of the digitizer area or tablet, the plan area, the keyboard overlay area and the descriptor overlay area. As to each area he identifies merely points, but through subsequent processing points in the plan area are given interrelated geometric significance, points in the keyboard area are given immediate numerical significance, and points in the descriptive overlay area are given codes for identifying geometric relations. Thus, a relationship between plan points is definable and qualitatively interpretable by the descriptive overlay and quantitatively particularized by use of the keyboard overlay.

The output proper of the digitizer is a single data stream defining only coordinate pairs; the computer separates them as to the area in which they originated, whereby the order of appearance of coordinate pairs in the stream is of associative significance and is used as such. The computer processes, interprets and analyzes this data stream and associatively assembles identifying codes with numerical information to completely describe the object illustrated in the plan area. That information can then be used in any manner desired. Different elevations can be plotted, materials lists compiled, etc.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a block diagram of a system for practicing the method of the invention; FIGS. 1a, 1b, 1c are schematic representations of particular portions of the storage facility in the systems of FIG. 1;

FIG. 2 is a schematic representation of the graph board used in FIG. 1;

FIG. 2a is a schematic example for a descriptor overlay. FIGS. 3a, 3b and 3c, are a flow chart for an input program as executed by a system of FIG. 1;

FIGS. 4, 5 and 6 are subroutine flow charts; and

FIG. 7 is a block diagram flow chart for a user program.

SYSTEM DESCRIPTION

Figure 3A:
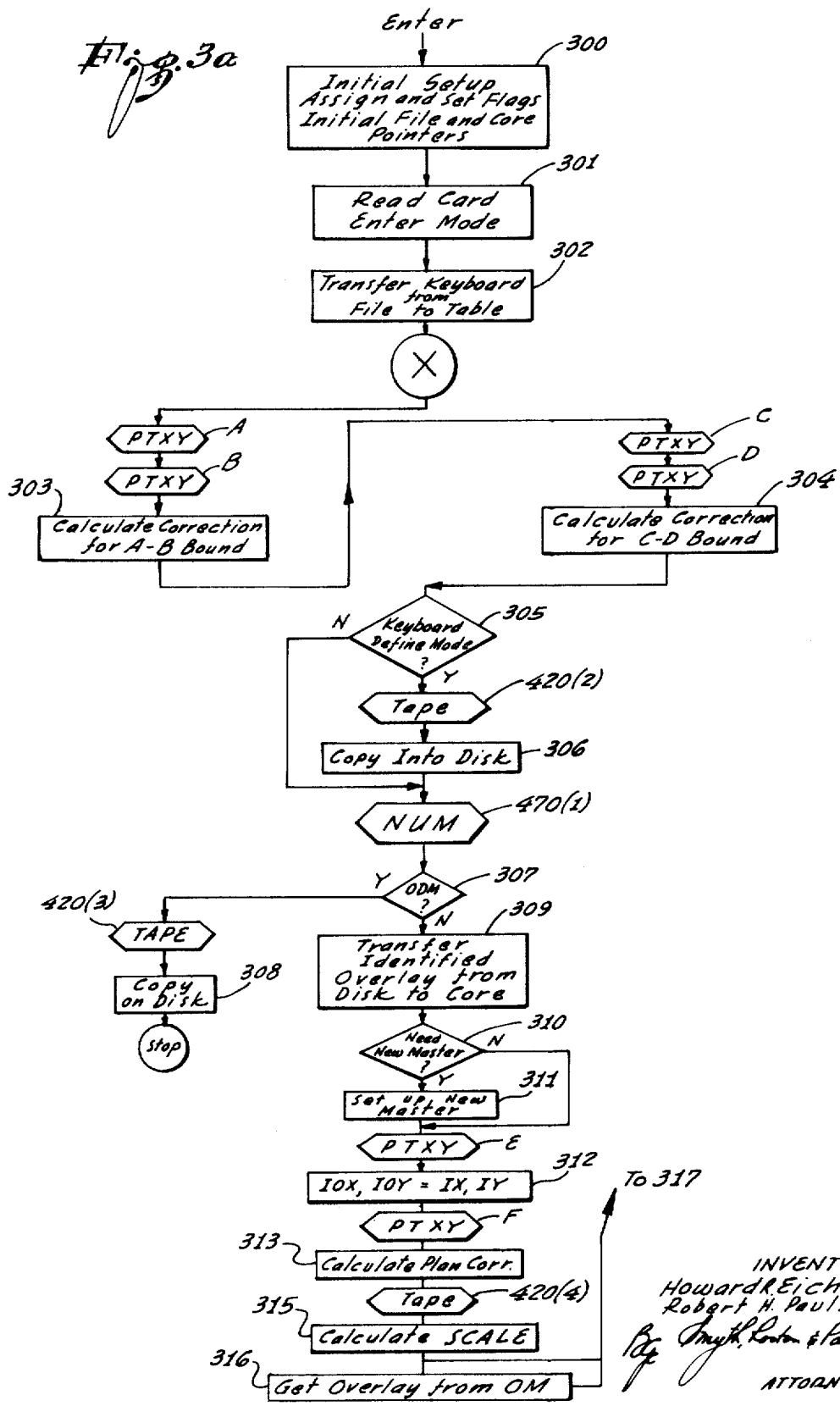

In FIG. 1 is illustrated a system representing by way of example implementation for practicing the method in accordance with the invention. Some parts thereof are shown in greater detail to facilitate orientation. In essence, the invention will be practiced by means of a computer system which comprises a computer 10 and includes the usual processor equipment such as 11. Processor is understood, possibly, in the collective sense in that processor 11 includes the normally provided central processing unit, or CPU for short, as well as input-output processors in case such separate units are provided for. In addition, the computer includes a memory 12, conventionally a core memory, but it may be any convenient random access memory as used in computers today.

These basic units cooperate usually and also in this case with a plurality of peripheral devices, sometimes called input-output equipment, and some of them are shown as far as they are pertinent for practicing the invention is concerned. The peripheral equipment may include a plotter 13, i.e., an XY writer that provides graphic display in response to a data stream supplied to it defining XY coordinates for a pen or the like. The computer system includes, of course, the conventional input-output printer 14 which may be an automatic typewriter, a regular strip printer or the like. These are the usual output devices for establishing an output that is directly useful to a human operator.

The system will of course include memory extension devices such as discs and/or tapes, etc., which do not require elaboration in the general sense. It is pertinent for explaining the invention, however, that there is provided a disc unit 15 interfacing with the computer and containing a number of files which, however, are distinguished through software only. A control bus 151 and a data bus 152 provide for the transfer of control information and data respectively between designated portions of the disc file and memory 12 of the computer, usually under control of the processor therein. Depending upon the particular computer system employed, operation usually requires that data are temporarily stored in a portion of memory 12 and transferred to a disc file or vice versa. As far as software control of these operations is concerned, it will be discussed more fully below, otherwise standard hardware equipment is of course employed. Also, details of the content of the disc files will be discussed more fully below.

As far as input devices are concerned, it is assumed that the computer has the usual card reader 18, primarily for inputting of programs prepared as a stack of cards, and also mode control information is inputted via the card reader. Next, there is a punched tape reader 16 of conventional design and coupled to the computer by means of two busses, there being a control bus 161 for transfer of control information and for entertaining a dialog between the tape readout and the computer, particularly as to stop and go control for paper strip advance in response to computer issued commands. The data bus 162 provides a flow of data, unidirectionally from tape reader 16 to the computer.

The punched tape serves merely as a link to an input device that prepares the tape so as to obviate the need for on-line operation via a link; also a permanent record of the input operation is provided therein. Therefore, the upper portion of FIG. 1 illustrates circuitry which can also be regarded as input equipment for the computer system, even though there is no direct and immediate link, but that input equipment prepares the tape. This input system is denoted generally with reference number 20 and includes the following elements.

There is provided a tablet 21 particularly cooperating with a "pen" 22. As a tip 221 of the pen is particularly brought into proximity to any point on tablet 21, a spark is produced resulting in emanation of a sound wave of steep and recognizable, shock wave like characteristics. In particular, upon touching the tablet with pen tip 221, a switch 222 therein closes to enable production of the spark.

As indicated schematically, sound waves issue from the particular point of engagement of pen tip with the tablet and that sound wave is detected by two microphones 23 and 24. As can be seen from the drawing, though somewhat schematic, the microphone 23 will particularly respond and detect the first sound wave front that has issued from said point of pen tip contact in the direction of the shortest distance between that point of contact and the microphone 23. This direction is representative of the X axis of an (hypothetically) overlaid coordinate system.

A second microphone, 24, will receive particularly the leading edge of the sound wave after it has traveled the shortest distance between the point of pen tip contact in the Y direction. Therefore, the two microphones respond independently to the issued sound wave, and they detect the first point in time of reception of the produced sound wave along X and Y coordinate axes. The outputs of the two microphones are fed to two amplifiers 231 and 241 respectively, and it was found that particularly the first steep half-wave of such a sound wave is very well recognizable and reproducible as an electric signal with a steep bank. Therefore, pulse discriminators and shapers 232 and 242 are provided on the output side of the amplifiers respectively to provide well developed control signals that identify in time the sound wave propogation across tablet 121 in X and Y directions.

The output signals of the two discriminators are used individually to set flip-flops 233 and 243. The flip-flops when reset open a pair of gates, respectively 234 and 244, for receiving additionally clocking signals from a high speed clock 25. As long as the two flip-flops are in the reset state, they provide gating signals that permit the clock signals respectively to pass to two counters 235 and 245. As the two flip-flops are set, due to detection of sound pulses, the counters stop individually at the respective count state arrived at that time.

Pen 22 includes the switch 222, as stated, which switch is closed as soon as the tip 221 is in physical engagement with tablet 21 and pressed down thereon. The switch closing may well be a mechanical motion resulting from physical displacement of the tip within the pen. As a consequence of closing switch 222, a trigger signal is provided to a circuit 26 which triggers or activates a high voltage source 261 connected to the tip 221 of pen 22 and a spark issues. The output of trigger 26 is also fed to a delay circuit 262, and the delayed trigger signal is used to reset flip-flops 233 and 243 and also to reset counters 235 and 245 to count state zero.

It can thus be seen that on contact of the tip 221 of the pen with the tablet, high voltage circuitry is triggered and a spark develops to issue a sound wave. Shortly thereafter, the two flip-flops and the two counters are reset and enabled so that they can begin to count pulses anew. In effect, these two counters count digitally the travel time for the sound waves toward microphones 23 and 24. After the sound wave has reached the microphones, the flip-flops are set and the counters stop. The counters stop of course individually; normally they will stop at different times except in case the point of contact between pen and tablet is at a point wherein X and Y coordinate values are equal.

After the counters have stopped, they hold information which is the digital equivalent of the travel time and can be regarded as defining a pair of X and Y coordinates of the point of contact between pen tip and tablet. Therefore, the counters hold digital representation as to which point on the tablet was touched by the pen. The delay of circuit 262 simply is a correction in the point of origin of that XY system. The microphones are thus not regarded as placed along the respective zero axes of the XY system but somewhat spaced apart therefrom, which simply is a constraint as to the tablet area available. This constraint serves primarily for suppression of errors; points should not be placed too close to any of the microphones.

As soon as both of the flip-flops are in the set state the content of the counters as holding the X and Y coordinate values of the location pointed to by the pen, can be transferred. An AND gate 27 responds to the set state of both flip-flops indicating that an XY coordinate pair has been detected by the tablet-pen arrangement. The same signal can also be used to effect transfer of these coordinates into two buffers 236 and 246, rendering these digital signals available on busses 237 and 247 while permitting reuse of the counters.

There is now provided a paper punch apparatus 228 which, in response to the signal 27, causes the two coordinate values to be sequentially recorded through appropriate hole punching in the paper tape 17. In essence, the paper punch provides a plurality of hole tracks, some for containing control bits, others contains data bits. A data frame is defined by all bits placed in parallel across the tracks, one bit per track, whereby a hole may represent a bit of value "one" and absence of a hole represents a bit of value "zero." Typically there will be five data bits per frame, a parity bit and two additional control bits.

Each of the X and Y coordinates may be represented by 10 bits for a resolution of one part in ($2^{10} - 1$) on the tablet and each coordinate will be recorded at two sequential frames of five bits each. The recording process may thus involve calling first on the five high order X bits as held in register 236, then the five low order X bits are recorded, followed by five high order Y bits in the third frame, and finally the five low order Y bits are recorded on the last frame. The first frame as having five data bits may be accompanied by a control bit in one of the control tracks for marking the beginning of a set of four frames for a pair of XY coordinates.

It is that tape 17 which is read by the tape reader 16 within the system. Paper punching and paper reading may well occur at entirely different phases of operation and at different times and/or different locations. It is readily understood that, in principle, busses 237 and 247, could be interfaced directly with the computer 10, operating, for example, on a time-sharing basis, with the output of the gate 27 serving as computer interlock to directly load the content of registers 236 and 246 into the computer memory. This, however, is quite impractical; using a punched tape as intermediary is more economical than a direct link. Moreover, the tape serves as a permanent record. Nevertheless, the device 20 must be regarded as a peripheral device of the computer. This peripheral device 20 provides a data stream recorded, for example, on punched tape. The data stream comprises a sequence of sets of frames, four frames per set, and each set representing a pair of XY coordinates identifying a point on the tablet that has been pointed to by means of pen 22.

The computer system processes and interprets this data in accordance with programming. That interpretation will be defined later in the specification. A particular example of the type of interpretation required for operation of the system will now be explained with reference to FIG. 2.

TABLET AREA

FIG. 2 is a more detailed representation of tablet 21 as a working area in which each point is merely characterized by a pair of XY coordinates that could be assigned to such a point through a coordinate overlay for an entire tablet and as actually generated by the spark producing, sound pickup and counting devices explained above with reference to the subsystem 20. It should be mentioned that this kind of tablet and this kind of coordinate generation is described only by way of example and it is equally possible to use other kinds of translators as between the designation of a point in an area and the generation of digital interpretation and representation thereof.

The tablet, in a typical case, is now hypothetically divided into three areas. The first area is defined in parts by tablet boundaries and by the tablet area to the left of a coordinate line X1. That line may be drawn on the tablet to facilitate use. This particular area is in the following called the plan area and is characterized by the fact that any point in plan area recorded on strip 17 is being given an interpretation of geometric significance, but only through processing. In particular, the spatial relation between two or more designated plan points is to have significance corresponding to the geometric relation between these points on the tablet. Typically, two points are to designate a distance, i.e., the end points of a line. As will be explained more fully below, the presentation of a pair of coordinates in that plan area will lead in the computer, upon processing, to an identification of these coordinates directly as a geometric or location descriptor, and through processing the coordinate values are associated with a geometric or location descriptor identification code.

The area to the right of the X1 line and above a Y1 dividing line will in the following be called the descriptive overlay area. Points in the descriptive overlay area are used to identify what in the following will be called quality descriptors. Whenever a point in the descriptive overlay area is pointed to by the pen, it is interpreted as a call for a particular descriptive quality. The quality is represented by a descriptor code, and a representation thereof is associated with the coordinate pair of that point within the file and memory system of the computer, so that the coordinates of that point when called by the pen and recorded on tape, can be used internally in the computer to call for the particular quality code. The coordinate values themselves are not made part of the descriptor identification, but are dropped once the association has been made.

The user of the tablet will be provided with a particular descriptive overlay, such as overlay 211. A more detailed example of such an overlay will be described more fully below with reference to FIG. 2A. On that overlay, the user will find specific quality designations and descriptor descriptions next to small areas such as circles 212, provided to encircle the descriptor points on the overlay. The user is instructed to place the overlay in the area above Y1 and to the right of X1. Upon touching an encircled point 212 by means of the tip of the pen, the X and Y coordinates thereof will be recorded and thereby that particular quality is preliminarily identified. The encoded representation of that quality is held within the file system of the computer in association with that pair of coordinates, and upon processing the tape by the computer the code will be assembled for further use.

One can, for example, make the following distinction among quality descriptors: a general qualitative descriptor, a quantitative descriptor with implied particular quantitative value or values, a descriptor that requires additional, quantitative information not implied, and control descriptors. A general, qualitative descriptor is merely identified by a code selected from within the range for all qualitative descriptor codes. The quantitative descriptors are identified by codes taken from a different range and the quantity values used for the respective descriptors are attached to the respective code for description and the attachment results from computer processing. Control descriptors are identified by codes, as such, but are treated on an individual basis. In neither case, however, are the descriptive overlay area coordinates of a descriptive point part of the code assembly; the overlay coordinates merely identify associatively the descriptor called for when the pen has touched the particular point.

By way of example, a general qualitative descriptor is used to identify particular objects, usually in conjunction with points in the plan area, delineating or identifying relative location of such an object. A descriptor with implied quantity includes a code which will be used to identify an object in conjunction with particular dimensions thereon. A quantitative descriptor without implied quantity is similar as to object identification, but it requires the value of the quantity or quantities to be supplied in addition. The manner of supplying such quantitative descriptors will be explained next.

The means for providing any quantitative information is the "keyboard" generated also on the tablet through use of an overlay. The particular area below line Y1 and also to the right of line X1 is designated the "keyboard" area. A special overlay 213 is to be placed onto and within that area of tablet 21. The keyboard overlay bears only circles 214 which together in effect illustrate a regular, normal keyboard. When so placed into the keyboard area of the tablet, the user simply uses the pen to touch the pictorial representation of the key; thereby he generates a pair of XY coordinates, to be recorded on tape 17, and software in the computer will interpret the recorded XY coordinate pair, when in the keyboard area, for example, as a digital number descriptor just as if that particular digit had been keyed in with a regular keyboard. Also, the processor will generate a number descriptor code and attach the same to the "keyboard" digit that is associated in memory with representation of the coordinate pair of the point in the keyboard area that has been touched.

As a matter of convenience, the keyboard area could also contain some qualitative and/or quantitative and/or control descriptors having immediate relation only to the keyboard. Particular circles here may define points associated with codes or numbers for defining dimensions of a number keyed-in and representing, for example, inches, feet, dollars, etc. Also, the keyboard overlay may have an "END-OF-ENTRY "key." The keyboard area may additionally include circles around points associated with letters to complete the keyboard area for a complete alpha-numerical keyboard. In particular, a portion of the keyboard area may literally be a pictorial representation of typewriter keyboard. Upon recording such a coordinate pair and processing, the coordinate pair will be found in memory to be associated with a numerical code that represents a letter of the alphabet or any other symbol. That code will then be associated with a letter descriptor for further processing and data assembly.

It should be mentioned that circles in any of the overlays could be used to identify a point to be associated with generation of control operation. Thus, such points will be associated in the computer with control descriptors. It should also be mentioned, that the differentiation of overlays as different physical elements is only a matter of convenience. There could be a single overlay with descriptor "keys" and alpha numerical character "keys." It is the presence of such different "keys" that is important per se, therein physical arrangement is dictated by convenience; as there are different descriptive overlays, it is convenient to separate therefrom the one keyboard overlay.

Summarizing the foregoing, the following can be said to be enlarged on later in this specification. Upon touching tablet area 21 anywhere by means of a pen as described, a pair of coordinate values is generated and recorded on tape in four frames. Each coordinate pair is subsequently processed and interpreted as a particular descriptor, having significance by itself as well as in relation to previously and subsequently recorded coordinate pairs generated in the same fashion. The coordinate pair in the plan area will be associated with a location or geometric descriptor identification code. That code is the same for all points in the plan area and may, for example, be digitally represented by the number 1401.

A coordinate pair in the descriptive overlay area will be interpreted as quality description particularly as general qualitative descriptor, special or alternative descriptor, quantitative descriptor or control descriptor, and will be associated with a particular qualitative or a particular quantitative or a particular control descriptor identification code, in the following called I-code and found in memory as being associated with the coordinate pair in the overlay area. In cases, the association with such a descriptor code may include digital representation of quantity description or describing numbers, found in memory in association with a particular I-code.

The coordinate pair in the keyboard area will be interpreted as alpha-numerical descriptor to be associated through processing with a generated number descriptor code or a letter descriptor code, as the case may be. Each such code will then be associated with digital representation of a particular number or of a particular letter code and numbers representing the value of the number or inside the letter. Sequences of coordinate pairs generated by the pen in different areas, and, possibly, in a particular order of sequence, will cause association of descriptor identification codes together with the various descriptions, if any.

The various associations and tablet partitions, etc. are to be understood only as a major convenience and not as strictly exclusionary rules. For example, particular subareas may be set aside anywhere on the tablet for placement of particular control descriptors. The two overlays on tablet 21, as depicted in FIG. 2, show additional points marked A, B, C, D, used for purposes of overlay alignment. Whether these points are associated with descriptors as defined above is open to interpretation, they will be treated individually.

Without intending to be restrictive, FIG. 2A illustrates an example for a descriptive overlay whereby it is presumed that the method is used in conjunction with architectural drawings to be placed in the plan area. In other words, it is assumed that the user has placed an architectural drawing on the plan area or is about to design one thereon, including for example floor elevations, etc. Therefore, the points he may touch in the plan area have geometric significance in the sense that they stake out the various parts and corners, etc. of a house including the end points of walls, and points of windows, doors, etc.

The particular descriptive overlay is used to provide descriptive and other associative information in relation to the drawing. The particular overlay illustrated can be called a walls overlay in that it contains description of descriptors by means of which a wall can be described. Other overlays, for example, may relate to floors, roofs, plumbing, wiring, etc.

An overlay by itself is a flat piece of plastic, cardboard, etc. preferably made of durable material. The operative portion of the overlay consists of circles, such as 212, which define overlay "points" in the respective center. Instead of a circle, one could use a square. In any case, the elemental area so marked around a point defines a range of tolerance within which the tip of the pen can be placed and be regarded safely as pointing to the "point" in the center. Processing of the tolerance is part of the input and tape processing program to be described.

Next to each point-defining-circle is written labeling or there is object identifying illustration to inform the user of the meaning of the descriptor attached to such a point. This association is, of course, totally arbitrary and can be chosen in any manner, particularly with primary emphasis on convenience. Overlay definition in that manner is part of the initialization program and will also be described later on as a particular branch of the input program.

Common to all overlays are two points A and B designated by circles or points as described and by means of which the particular position of the overlay, when placed in the overlay area, is defined. The user is instructed always to touch these two points A and B first and that will establish position parameters for that particular overlay. Starting operation in that manner permits corrective association between the points of the overlay as touched and the point coordinates as they are stored in the so-called overlay table as digital data of the computer system. Elaborating on this point, it should be noted that the computer memory is capable of directly associating only particular coordinate points of the overlay area with the particular descriptors and their codes. but the overlay demarcations for these points may not coincide if the overlay had not been placed exactly in a registering position. By marking two points A and B on the overlay, corrective parameters are generated to compensate for such misalignment.

One of the characteristic features of such an overlay is a hierarchy structure of some of the descriptors, particularly of the general qualitative descriptors and we distinguish here between unit descriptors, and item descriptors. Thus, within an extensive input operation, the user will deal with several "units." A particular wall is a unit. All units have unit descriptor identification codes within a range, for example, from 1,000 to 1,199. A unit will have several items, for example, windows, doors, or other openings in a wall. Items may have descriptor identification codes in the range, for example, from 1,200 to 1,299. Further distinction can be made for such a descriptor point as whether the unit or item it represents is to represent insertion or deletion of the unit or item. Different I-codes can be assigned, one each for insertion and one each for deletion. It can easily be seen, that such hierarchy structure can be developed further if needed.

The walls overlay illustrated in FIG. 2a, is used for all walls in the following manner. Two circles are drawn around points labeled for "insert" and "delete." The user will touch the point "wall insert" first. Upon processing the punched tape, the computer will later interpret the coordinate pairs of this point as associated with the "insert wall" descriptor identification code, for example, 1101. The user is instructed to touch next two points in the plan area which are the corner points of that particular wall. Thereby he defines the position of the wall within the plan area and, particularly within his drawing made. Without further steps, the two points will also define the relative length of the wall.

The circle labeled "height" refers to the height descriptor of the wall. The coordinates of that descriptor point are associated in memory with a particularly quantitative descriptor code identifying and related particularly to "wall height." It is convenient to distinguish, for example, between one-number and two-number descriptors, express or implied. "Wall height" will be a one-number descriptor. A one-number descriptor includes a one number descriptor identification code associated in memory or to be associated additionally with a number value (in addition to association with the point coordinates in the overlay area). That number may have to be keyed in by the user or, for example, in case of height, a standard height value may have been associated already in memory with the wall height descriptor code.

One number descriptor identification codes may, for example, have a value from 1,300 to 1,399, two-number descriptors may have identification codes between 1,400 and 1,499. Please note that the location descriptor code 1401 falls in that class, because the location code has character of a two-number descriptor. However, the location descriptor does not have to be used on the overlay as a special point. The two numbers are in this case, and only in this case, the two plan coordinates, and the descriptor code is generated as a result of detecting a plan point. Quantitative descriptors as defined on a descriptive overlay have their coordinate representation dropped once the association is made.

It may be assumed that in the particular example, the number value for the wall height is not implied. After having touched the point "wall height" in the overlay, the user is instructed to subsequently key-in the value of the height he desires using, of course, for this purpose the keyboard overlay! Upon using the keyboard overlay, he generates separately coordinate pairs, and it is part of the input program to associate the wall height code entry with the particular keyboard entries made thereafter and representing the number that has to be keyed in for the particular one-number descriptor.

There may be different types of walls which aspect does not have to be discussed in detail; these e.g., standard walls, balloon, gable, or continuous header type walls, etc. Each of them can be regarded as a special type of qualitative descriptor for more particularly describing the wall. These types of qualitative descriptors (not identifying per se a unit or an item but modifying same) may also be termed alternative descriptors represented by alternative descriptor identifying codes. These codes may be within the range of 2,000 and up. As they are qualitative descriptors, they are only represented by an identification code, without association of additional value numbers in the input system (except for the coordinate points in the overlay area with which they are associated.) Usually, they will lead to particular branch programs for more complex numbers and value sets to be called and included.

In addition, there may be a requirement for particular pitch of the roof (one number descriptor) and there will be different heights on different ends of the wall; overlay points will be provided for each of these possibilities. Another aspect of a wall to be described, particularly in case of a wall for frame houses, is the stud size as well as a stud spacing. There are correspondingly labeled "points" in the descriptive overlay. Either descriptor has a quantitative descriptor code, stud spacing has a one-number descriptor I-code, stud size has a two number descriptor I-code, namely for the cross-section dimensions; the height of the stud will result from the wall height.

In either case, stud spacing or stud height, the descriptor values may be implied, i.e., in memory the particular overlay point is found in association not only with the stud size or stud spacing identification codes but also with the respective size and spacing values. Alternatively, it may be required to key-in the particular values of the describing numbers.

For example, the user will first touch the stud size descriptor point in the overlay, which in this case is associated in memory only with the stud size descriptor identification codes. Next he will key-in the two values for width and thickness dimensions for the studs to be used. The height, of course, is determined by the height of the wall and need not be associated with the studs at that instance.

Stud spacing is a one-number descriptor. If spacing is not implied, it requires the touching of that overlay point whose coordinate pair are associated in memory with the stud spacing descriptor identification code. Subsequently, a number is keyed in by the user and that will give the spacing in between any two neighboring studs on that wall. Upon processing the input, that number will later on be associated with the stud spacing identification code.

As the construction of the wall will depend on whether it is a first or second floor wall or whether the wall is load-bearing, the user will have to touch the appropriate points so designated in the overlay. The codes associated with these points are clearly qualitative, alternative descriptors.

Aside from describing the wall from an overall point of view, the wall as a unit may or may not be provided with certain items, such as doors, windows, fireplaces, etc. Through appropriately circled points of the overlay, insertion or deletion of these items is indicated, followed usually by the keying-in of the location in the plan, followed, in turn, by touching quantitative descriptors calling for door or window height, as the case may be.

It can, thus, be seen that by virtue of a descriptive overlay, plural units (e.g., walls) can be defined within the plan area using the same overlay but sequentially staking out and identifying each such particular wall, describing it, providing it with appropriate items (doors, window, etc.,). Each unit always begins with the keying-in of the unit descriptor point, and then the unit is detailed through insertion of the location of the wall and, possibly, by keying-in additional dimensions and further detailing descriptors, as well as by inclusion of additional items which are more fully described qualitatively as well as quantitatively. Quantitative description refers generally to the location and dimensioning of such unit and item whereby, for example, the location is described in a plan view by means of plan points and height or other dimensions are keyed in numerically. Please note that use of height-descriptors permits the inclusion of dimensions transverse to the plane of the plan area.

In addition, a descriptive overlay will include circles identifying overlay points that are to be associated with particular control descriptors such as "reference," "-skew," "end-of-overlay," etc. The latter "point" will be touched for generation of an end-of-overlay code (EOOF) to signal the end of use of a particular overlay. An option should be mentioned here. Each overlay may also be provided with a control descriptor key marked "end-of-tape," to signal that further overlays are not used. Alternatively, the tape punch 28 may have a control button included for that purpose. The meaning of the other points will be explained pursuant to description of the program.

From the foregoing, it will have become apparent that the descriptor overlay as well as keyboard overlay in the plan area permit a versatile interplay. Geometric configurations are described and more particularized through the use of the overlays. However, at this point, the dimensions staked out in the plan area are limited to the accuracy of pointing to the plan area. It is also possible, as will be developed pursuant to program description below, to have two geometric points in the plan area scaled to a much greater accuracy than possible by way of pen pointing, simply by keying-in, subsequently to pointing to two points in the plan area, a number having any desired degree of resolution, and that number will be used to correct the coordinate values of the plan points so that they assume the distance relation exactly as keyed-in and at a greater accuracy possible than by pen pointing alone.

Another point to be made is that the various descriptor overlays each use the same overlay area and possibly the same points therein. The distinction comes from overlay identification, which causes the various points in the overlay area to be associated with descriptors in a new and different association and correlation for each overlay.

DATA FORMAT AND STORAGE

Before proceeding to the description of particular input program by means of which the tablet inputs are appropriately processed, some remarks are necessary concerning the format of data as well as of relevant storage facilities.

As stated above, the punched tape 17 is provided with a sequence of digital representation of coordinate pairs, each representing a point in the tablet that has been touched by the pen 22. These X and Y coordinates are presented in four sequential frames, two frames defining digitally the X coordinate word and the next two frames defining the Y coordinate word. The two words or four frames are to be identified by a control marker such as 171 and it will be explained more fully below that, upon reading, the tape reader 16 is controlled to step from position to position as marked by the control markers while reading the four frames in one reading step.

The disc memory 15 includes a number of files with each file containing particular data in a format that can be described as serial-by-word. A typical word is a descriptor identification code (an I-code), as outlined above; other word are the X coordinates and the Y coordinates (one word each); still other words are describing numbers, each up to the limit of the word format range which may be $2^{16}$ for a 16-bit word format. Particulars of the storage format per se are not important.

One of the files is called the master file 153. Actually the master file may be divided into "old" and "new" master files, but this distinction is not relevant for explaining the invention. It need only to be explained that in the master file there is accumulated the output of the input program, i.e., there is accumulated the interpreted sequence of pen-tablet interaction. The old master file will hold the completed data while the new master file is used to accumulate completed interpretations of one overlay after the other. Such an output file usually beginning with a unit identification code, is a sequence of words. Generally, a descriptor identification code or I code is followed either by another I-code or by a descriptive number, or by a pair of processed X-Y coordinates if the I-code was the location descriptor. Such a descriptive number is either followed by another or by an I-code; a coordinate pair will always be followed by another I-code.

The file 154 is called a scratch file and is used for accumulation and step by step buildup of the interpreted coordinate pairs as recorded on tape. Again, the scratch file may be divided into new and old files which is inconsequential for the invention. It is merely a matter of programming convenience to update a scratch file by swapping information between two scratch files. The data format in the scratch file is similar to that of the master file.

The file 155 is called the overlay file. Generation of the overlay file will be explained below. Suffice is to say presently that it is a file which includes several group of words or word sets. The complete overlay file can be divided into a number of files, each one associated with one particular descriptive overlay. The file for one descriptive overlay contains a plurality of word sets and each word set is composed and has a format as can be seen best from FIG. 1a.

A word set has a pair of coordinate words X and Y, for example, which define a particular point within the overlay area of tablet 21. These are the points of the tablet which will register with the center of circled areas 212 provided the overlay has been placed properly and in strict registration with the tablet points. However, it was mentioned above that points A and B on an overlay serve for alignment correction. This detail does not have to be considered presently.

In a typical case, at least one, more often two or three, related codes are associated with such a coordinate pair of the overlay table. One of the codes is always the particular descriptor identification code or I-code. Thus, it is this file which provides for the association between descriptive overlay points and descriptor identification by means of digital signals. Such a file, when copied into memory, establishes an overlay correlation table to be used for interpreting tablet points as descriptors. Note, that the different overlay files all refer to the same overlay areas, as only one overlay at a time is used.

As outlined above, we distinguish between qualitative, quantitative and control descriptors, and the classes are distinguished by ranges used for the codes. In case of a quantitative descriptor, the codes N1 (one number) or N1 and N2 (two numbers) will be the respective describing numbers themselves unless a special code ($2^{16}-2$) in such a word position is used to indicate that the particular quantitative value has to be keyed-in. Other variations and utilization of other control numbers near the upper end of the range ($2^{16}$,) are used, as will become apparent more fully below.

The first one of these word sets for a particular overlay file is preceeded by the identification code for identifying that particular overlay. That overlay identifying code need not be associated with an X-Y coordinate pair in the overlay area, though such possibility should not be excluded. Another particular identification code in an overlay file is used to mark the end of an overlay file to distinguish that file from others in the complete overlay file 155.

The so-called keyboard file 156 is actually part of the complete overlay file but is reasonably considered to be a distinctive entity. The keyboard file is also composed of such word sets, i.e., there are plural pairs of X and Y coordinate words defining points within the keyboard area (see FIG. 1b). Each of such pairs is associated with a code representing, for example, the digital value of the "keys" as defined in the corresponding keyboard overlay as associated with that pair of coordinates. The code may actually be a binary equivalent of any number 0 through 9.

In addition, the keyboard may include symbols and letters, and they are represented by basically arbitrarily selected respective codes. Finally, the keyboard area will include particular "keys" associated with control descriptors. Such "keys" are represented by particular XY coordinate values for the center of a pictorial representation on the keyboard overlay when placed in the keyboard area control "keys" are, for example, "end-of-entry" or dimensional control keys implying, for example, that arithmetic has to be performed to obtain consistent scaling and dimensioning.

For example, all dimensions which may be keyed-in may be understood normally in units of one-eighth inch. A special "key" may denote "inches" requiring the preceding number to be multiplied by eight. Another key may be the key for control descriptor "-feet" which indicates that the number previously keyed-in is dimension in feet. Therefore, upon pressing such a key there will be an implied multiplication by 12 followed by a multiplication by eight.

In all these cases, it has to be pointed out that an XY coordinate pair from the keyboard area is associated in the keyboard file with particular key value or key value defining codes. Particular descriptor identification codes are not part of the keyboard file as number and letter descriptor codes are generated separately. It will be recalled that the number and letter descriptor codes are the same for all numbers and for all letters respectively. Additionally, it should be pointed out, that the X-Y coordinates of the keyboard file refer to such coordinates in the keyboard area. These points are identified by a keyboard overlay. Ideally, the overlay is placed in precisely registering and aligning positions. However, for correcting misalignment, the points C-D are provided on the overlay to be used for obtaining software misalignment correction.

The computer memory 12 includes, of course, conventional circuitry and considerable portions thereof will be used and dedicated for compiling regular computer operation. Also, of course, this system may be used on a time-sharing basis so that various programs may be resident in memory. For the execution of the input program and for evaluating and interpreting the several coordinate points as presented to the tape reader 16 by the tape 17, certain areas and portions within the core memory are needed and have significance in the description of the program below. To a description of these special memory portions and areas, we now turn.

First of all, there are the current "overlay table" and the "keyboard table." The "overlay table" holds the entire content of one particular overlay file which has been identified previously and was caused to be copied from disc file 155 into core memory. It is convenient to define a word set location, which includes the X and Y coordinate values as locations of a descriptor in the overlay area, the descriptor I-code being associated with that overlay area point and with describing numbers, if any. The "keyboard table" is just the entire keyboard file copied into core memory.

Next there is the I-core table. The content of the "I-core table" is built up, step by step, as all data related to a unit are accumulated therein. Prior to processing the data of the next unit, the I-core table content is transferred to scratch file 154. Usually, this I-core table begins with the identification descriptor code for a particular unit, and data related to that unit are accumulated in the I-core table until processing encounters the I-code of another unit. The current entry in the I-core table is identified by an I-core pointer which actually is a number defining core memory address for the next entry to be made in the core table. An END-OF-UNIT (EOUF) marker code demarks the other end of the core table as filled thus far. EOUF does not demark the end of the core memory portion available as core table.

Another portion of the core memory is set aside as the so-called Q register for temporary storage of the I-code and of all related codes and numbers found in the overlay table presently resident in core memory under that designation in association in the *a* coordinate pair of a descriptor point. A Q-pointer identifies a location for the current entry in the Q register. In the following we will distinguish between Q1, Q2, Q3 etc. register portions, each such portion permitting storage of one word. An IQ register is used analogously but by different program routines. The front section of the IQ register is called the I-code section which holds a descriptor identification code; the describing numbers are set into additional sections of that register. A pointer identifies the current entry in the IQ register. An N register with pointer is used to accumulate multiple numbers, a CM-register with pointer is used to accumulate letter strings.

A "plan point table" identifies all location points in the plan area 215 (plan points) that have been used in conjunction with an input operation. Plan points are defined by coordinate values in this table stored therein, at maximum desired accuracy and in consideration of scaling operations, supplementing dimensions, etc. Each such point so entered is associated with a "counter" which is a word location in memory associated with a particular plan point that has been entered; such "counter" location holds a number representing the number of uses a point has been made of.

A "point array" table is a working area in memory used in the stepwise process of obtaining increasing accuracy in the geometric relation among the several points, prior to insertion in the plan point table. Also, each point so processed will be set into the I-core table, the coordinates being the two numbers that describe the two numbers and location descriptor 1401. No such descriptor code is needed in the point array table or in the plan point table. The two point tables, of course, each are associated with pointers for control of current entry.

INPUT PROGRAM - FIRST PART

We now proceed to the description of the program used to process the information on strip 17. It is repeated that this strip contains only digital representation of coordinate pairs of points touched on table 21 by pen 20. However, the user who has prepared the tape by means of suitable overlays, is instructed to proceed in a particular manner. Particularly, he has to touch points in various areas in particular sequence, and he has to begin such operation in a particular manner. In the following description we shall refer repeatedly to these user instructions upon describing processing of information particularly on basis, what particular coordinate points are expected to have been recorded next on the tape. The program is described on basis of flow charts, summarizing the essential parts of the program. A print-out of the Fortran statements of the complete input program is appended to this specification.

The main program sequence is illustrated in three FIGS., 3a, 3b, and 3d. We turn first to FIG. 3a. The main program is begun through entry statement or box 300 referring to the initial setup which includes the usual assignment and the initial setting of flags, definition of file, registers, etc. After the initialization the program shifts to box 301, and a card will be read by the card reader 18. This is conventional computer operation for determining the mode of operation. For purposes of this program we distinguish the following three modes which are listed in their order of normal use.

The first mode is the keyboard define mode, used to define the keyboard on tablet 21. During any mode a keyboard overlay is placed in the keyboard area but in the keyboard define mode the "keys" are identified both as to their location on the suitably placed keyboard overlay and to what the keys are to represent. The process, therefore, involves particularly the generation of the keyboard table (FIG. 1b) and its transfer into the keyboard file 156.

The second mode is the so-called overlay define mode in which encircled descriptor points in a descriptor overlay as placed in the overlay area are identified (1) as points in the overlay area, and (2) such points are additionally associated with related codes under utilization of the keyboard which must have been defined at that time. In particular during this mode, overlay points are defined and the relevant codes for establishing each point as a point are keyed in. Thus during the overlay define mode an overlay table (FIG. 1a) is generated as to coordinate point-code association.

Of course these two modes, the keyboard define mode and the overlay mode both have their counterpart in operator use, and the computer program mode in the strictest sense involves only the processing of that use. In other words, the content of the tape during these modes includes information only as to the keyboard table and overlay table generation without involvement of the plan area.

The third mode is the normal mode or operate mode. This mode is used only if there is at least one overlay on file in the computer system and if the keyboard is already defined and also on file in the computer system. On basis of these files and in conjunction with the particular overlay properly placed in the descriptive overlay area and in the keyboard overlay area, the user can now use in addition the plan area, and in conjunction with these overlays points of geometric significance have been touched by the user. In the normal mode these various related entries in plan area, keyboard area and overlay area are processed.

Upon running the program, a card will have been put into the card reader to define the mode and as per box 301 the mode flag is set correspondingly. However, regardless of the mode as so selected, a previously prepared tape as it will now be read by the tape reader in steps, and as determined by the program is begun under particular rules. The user knows that at the beginning of preparing such a tape points he touches have a very definite meaning for initialization operation or setup. It is not necessary to describe that in case of error i.e., in case of failure to observe these rules, the program will include provisions to branch into a trap routine to deal with the situation accordingly.

The user rules to be observed in the beginning, are the following:

Upon placement of a descriptor overlay as well as of the keyboard overlay in the appropriate areas on the tablet, the two points A and B so marked on the descriptor overlay have to be touched, in that sequence, followed by touching of the points C and D so marked on the keyboard overlay. This way the exact location and placement of these two overlays is indicated. Therefore, the first four coordinate pairs recorded are then four points. This holds true regardless of the mode.

The program, after having established the mode, enters into a routine identified by PTXY or "read the X and Y coordinates of a point from tape." As tape reading is used generally in computers, no further details are needed here. This subroutine will be called for in any tape reading input operation. Each time PTXY is called the paper tape is stepped through four frames (as marked by control marker 171) to read the two words for each of the two coordinates X and Y from paper strip 17. The PTXY routine returns the two X and Y coordinates. Presently then, the first PTXY subroutine returns the coordinates of point A. The program proceeds immediately through another PTXY routine to acquire the coordinates of point B. By means of these two points, the physical orientation of the descriptor overlay is being established for further use.

As part of the initial setup, the coordinates of two reference points that can be called A* and B* are provided. All descriptor overlay points and coordinates are to have a particular reference to these points. Ideally an overlay is placed upon tablet 21 with its points A and B in precise registry with points that could be identified by A* and B* on the tablet. However, an overlay will only approximately have such a normal position. Usually it must be expected that the overlay is misaligned relative to that normal position. This is now made evident by an apparent deviation between the coordinates of points A and B as they were entered in the tablet and as now read from the tape, on one hand, and the coordinates of reference points A* and B* as stored in the computer. The latter coordinates can also be called the normalized A and B coordinates.

Therefore box 303 refers to calculations carried out for establishing a matrix which defines correction values. Each point subsequently touched in the overlay area will have its coordinates corrected to be referenced to the normalized coordinate points A* and B*. One will particularly see the importance here if one realizes that the same overlay will be used several times but not in immediate sequence i.e., for each such use the overlay may be placed in the overlay area anew. This includes even the first use of such overlay in the overlay define mode. In each case then the overlay will not have exactly the same position as before. Now, with the introduction of this correction matrix, the point positions are normalized and referenced to points A* and B*. For each new placement of the descriptor overlay in the overlay area, a new correction matrix is calculated accordingly, as each time points A and B will be different.

Having calculated the correction matrix, the program proceeds twice through the PTXY routine to read the coordinates of points C and D. These two points establish analogously the position of the keyboard overlay in the keyboard overlay area. Analogously then, in box 304 a second matrix of coordinate correction values is calculated to normalize keyboard inputs relative to initially store coordinates for reference points C* and D*. The calculated matrix represents alignment errors or misalignment of the keyboard overlay relative to a normalized position.

At inquiry box 305, it is determined whether the program runs in the keyboard define mode. If so, a subroutine called TAPE will be called. Pursuant to that routine plural coordinate pairs will be read from the tape and interpreted to define the keyboard table. This will be explained more fully below with reference to FIG. 5. The TAPE routine is generally designated by reference numeral 420. The number in parenthesis thereafter designates the different places in the several routine and branches of the program where TAPE may be called as a subroutine. Presently, therefore, this is identified as 420(2). At the end of that subroutine TAPE, the keyboard is defined and the keyboard table is copied into the disc file (box 306) to establish therein the keyboard file 156. The system for example may shift automatically into the overlay define mode thereafter. If the program did not run in the keyboard define mode the program loops around the TAPE routine 420(2).

Next in the program a routine NUM is called details of which will be described more fully with reference to FIG. 6. As a result of executing the NUM routine 470 at position 470(1) and as subroutine within the main program, a number is returned that is the keyed-in number identifying a particular overlay that is being used or is about to be defined. Thus, as the user has prepared a tape for purposes other than keyboard-define, and after he has touched points A, B, C and D on the tables, he was instructed to subsequently key-in the overlay identification number.

If the system is in the overlay define mode, the program branches pursuant to the inquiry at 307 and along the affirmative answer branch thereof to call TAPE 420(3). Upon executing TAPE in the overlay define mode, the tape content thereafter is interpreted as defining an overlay. After completion thereof the program will stop. The details of the overlay define operation will also be described fully below, as part of the description of the TAPE routine.

If the overlay already has been defined, then the system is in the normal mode (or has to be placed in the normal mode) so that the keyed in number identifying a particular overlay returned by NUM 470(1) (following the keying in of A, B, C and D) is used to control a transfer operation (box 309) according to which the computer searches through the disc file portion 155 to find the particularly identified overlay file. If the computer does not find that overlay file, of course the operation stops as an error situation is present. After the file has been found, the file is transferred to core memory to become resident therein as the overlay table. This table is as assembly of word-sets (see FIG. 1a). Each word set has a pair of X and Y coordinate words associated with one or several codes such as a descriptor identification code, or I code for short and describing or control numbers associated therewith.

Having set up the overlay table in core memory as per box 309, the program inquires whether a new master file has to be set up (310). This will be the case if a new object was placed in the plan area and an entirely new operation is begun. The master file is the one in which the result of the input program is accumulated. It may however be the case that the program currently executed is a continuation of a program that has been begun previously and was interrupted for any reason, or a different overlay may have been used and now the user returns to the original overlay and continues. Nevertheless it is assumed that the same object in the plan area is being described as part of this operation. In this case then, a new master file does not have to be set up. Depending upon the outcome of the test a new master file is or is not set up depending on suitable flag setting.

Again we have to refer temporarily to user instructions as to rules to be observed during preparation of tape 17. The user is instructed that, after having keyed in the number identifying the overlay to be used, he must define a point of origin in the plan area (E) and to place a second point in plan area, F, in particular relation to point E to define a normal direction EF, at least approximately along the X axis in the plan area. All coordinates in the plan area will later on be corrected and transformed so that the user can assume for his purposes that the direction EF does define the direction of the X axis with E being the point of origin. By implication he can assume also that "his" Y axis will be precisely normal to that direction EF. Additionally, the points EF together establish a distance in the plan area, which as a distance is to be associated with a particular scale value. Therefore, the user is instructed, subsequently to pointing to the point that is to become the point F, to key in a number that will be used as a scale, i.e., the number he now keys in will define the value of distance EF in feet, inches, yards, miles, microinches, etc.

By way of example, the user may place plan point F precisely 1-inch from point E, and then he keys-in "1"–"0"–"0"–"inches" to establish that the drawing he is about to particularize in the plan area is to be understood in a 100:1 scale. Later on, all coordinates in the plan area will be transformed with E as a new zero point of origin, and all coordinates will be transformed further and given values on basis of that scale so that all geometric locations within the plan area are scaled in relations to the value of distance EF.

Returning now to the program execution (beyond box 311), the program calls PTXY again for reading the pair of coordinates on tape that is expected to define E. As per box 312, these coordinates are called IOX and IOY and will now define the new 0 point. IOX and IOY will be used to obtain transformation of all subsequently detected plan point coordinates. Subroutine PTXY is called again to read the next pair of coordinates, which are point F.

As per box 313, angular correction factors are calculated, such as sine, co-sine, etc. representing the deviation of line EF from the X-axis inherent in tablet 21 operation due to microphone positioning therein. It can readily be seen that e.g., any misalignment of the microphones or any other position error sources will be eliminated by defining in that manner a "user X axis." All plan coordinates will be angle-corrected on that basis.

Next, the routine TAPE is called again as per 420(4) and TAPE will return the scale number that has been keyed in. Box 315 now refers to the setting up of the scale factor, normalizing the keyed-in distance value as between E and F by recalculating the X-coordinate value of F (E is "0") as representing that distance, and by calculating the scale further (EF in the plan area does not have to be 1 inch!) the other plan points will subsequently have their X and Y coordinates recalculated on basis of that factor In case the present program is a continuation of the previous one which was interrupted for any reason, the previously completed portion held on the master file is then brought into the scratch file and is also rearranged within the master file as per 316. In case of a completely new operation, box 316 is bypassed. In any event, the program now arrives at point 317. Having arrived at point 317, the basic setup operations have been completed. The following portions of the program relate to the stepwise acquisition and interpretation of the various coordinate pairs read subsequently from tape. The processing of these coordinates is carried out through several interrelated loops. However, it is advisable to interrupt the description of the main program at the present time and to turn to the description of several salient routines and subroutines including the ones briefly mentioned above. It is also advisable to describe as part of the subroutines the keyboard define mode and the overlay define mode and after having described these modes we shall return to the continuation of the main program beyond point 317.

ROUTINES "READ", "TAPE" AND "NUM"

We will now proceed with the description of several salient routines and subroutines. Of basic significance here is the so-called READ routine which includes several subroutines to be described in parts. The READ routine is outlined in FIG. 4. It is a principal instrumentality by means of which an I code together with associated describing and/or control numbers is taken from a designated source and returned to the program or routine that called for the READ routine. Thus, READ will always return a complete word set. The calling program will either call for READ-tape or for READ-core-memory or for READ-disc. The READ-tape part of that routine is the principal instrumentality for a sequential acquisition and processing of coordinate points of the paper tape. Reading proper is always just carried out by PTXY.

The READ routine as a whole is identified by a reference numeral 400; that number is used as entry point for the routine in FIG. 4. As READ is entered, the first performance is per block, box or statement 401 and involves the determination of the source from which a word set is to be taken. As stated, three different sources can be designated upon calling for the READ routine and we will refer specifically now to the various sources from which a word set is to be taken. As per box 401, the branch is determined along which this routine has to proceed in order to obtain the data from the designated source.

Assuming the source is designated as the tape, then the routine calls for TAPE as subroutine 420(1) to be described in detail later with reference to FIG. 5. Briefly, TAPE 420 (1) will cause the next coordinate pair to be read from tape (unless already read but not processed) and these coordinate pairs will be interpreted, possibly under utilization of the current overlay table and the keyboard table. Usually a descriptor identification word code will be returned upon completion of execution of TAPE. The return statement 402 acknowledges that now an I code has been returned and is stored in the I code section of the IQ register. The identification code returned may be the location descriptor code 1401 or any of the other types of descriptors introduced above.

A similar return is provided if the designated source for the execution of the READ routine is the disc file. In this case, a subroutine disc is executed but does not require description. As a consequence of executing DISC, an identification code will be returned from the designated disc file set in the I code section of the IQ register. A third branch is the MEM subroutine, block 404 and simply means that from the I core table the final word of a word set (again, normally, the I-code) is being taken out of the word set location as designated by the pointer for the I-core table (See FIG. 1c). Additionally, the pointer will be reset thereafter to point to the next word in the same word set location.

The word that is being returned as per 402, is usually a descriptor I-code. As per box 405 it is tested whether or not it is an I-code other than a control descriptor. If not, box 406 tests as to presence of a control descriptor code. If likewise not a control descriptor, a flag is set as per box 407 accordingly and the routine exits. However, such is not the case normally, as the READ routine is usually called under conditions that the return of a descriptor identification code can be expected.

If the descriptor identification code is not a control descriptor, it may be a qualitative or a quantitative descriptor. If it is a qualitative descriptor, the code returned may be an item or a unit identification code (general descriptor) or an alternative descriptor. The type of descriptor other than a control descriptor is determined as per box 408 and in case of a qualitative descriptor, a flag is set as per box 413. The I code or the descriptor is already in the I code section of the IQ register and the routine exits.

The situation is different if the descriptor code is determined as being a quantitative descriptor. If a one-number descriptor code had been returned, block 409 interrogates where the descriptor number is. Usually, but not necessarily, it will be in the same source from which the descriptor identification code had been take. This means that if the descriptor identification code was returned from DISC, the number associated with the descriptor code will also be on the disc and it will in fact be the next word thereon. The DISC routine is called again, as per box 410, and will return the next word from the disc. If the describing number is in the next location in the I-core table (next to the one from which the I-code returned previously was taken), that number will be taken out as per block 411, the pointer will be reset, etc.

The descriptor code returned as the result of tape reading can be expected to have the describing number neither in the file nor in the I-core table. Also, the describing number itself is not on the tape as the tape itself does not hold any codes. Instead, the describing number will be held in Q2 location of the Q register and will therefore, as per box 412, be taken from there. In either case, the three branches 411, 410 and 412 will return to box 413 where the completion of assembly of the words pertaining to a word set is affirmed. Presently, a one number descriptor was considered, so that completion of assembly is affirmed when the IQ register holds the I-code of the descriptor and the one describing number.

In case the descriptor code that was returned, as per 402, is a two-number descriptor I-code, the two numbers will be fetched and taken out of memory or from disc (boxes 415, 414) as the case may be. This is analogous to the operation performed under 410 and 411. In case the two number descriptor code originated through tape reading, box 416 requires the first number to be taken from the Q2 register portion, the Q register pointer is incremented (box 417) and the second number is taken from Q3. The assembly is completed as per box 413 when the two number descriptor code as per box 413 when the two number descriptor code with the two describing numbers is held in the IQ register, whereupon the READ routine exits.

In case a special control code is returned on 402 to the IQ register, there are different cases possible. Often, the code stands alone, so that appropriate flag setting as per 413 suffices, the code is already in the I-code section of the IQ register. One special control code that may be returned on 402 is the end-of-file marker, in which case a special flag is set, box 494. The number identification code is of separate interest. This number identification code is generated when a coordinate pair on tape is recognized as a point in the keyboard area. Therefore, if, as per box 492, that special number descriptor is detected as having been set in the I-code section of the IQ register. The number value itself is taken from Q2 register (box 493) and is also set into the IQ register pursuant to assembly step 413.

The operation is analogous if the code returned is the letter descriptor in which case the string of letter codes is transferred from the CM register to the IQ register. Note that the letter descriptor I-code (18) identifies the digital data appended to it as (individual) letter defining codes. Other control codes may be recognized as such and result in particular flag settings (495); among them is the special "delete" code 3; the "skew" code, the "reference point" code. These will be described fully below. All of them may only be recognized summarily, there is no need for further distinction at this point in the program.

It can thus be seen that the READ routine will return an I-code in a section of like designation in the IQ register and there may or may not be associated describing numbers depending upon the type of I-code that is being returned. In case of the location descriptor I-code, the numbers returned in the two other sections of the IQ-register will be the plan coordinates, properly scaled and dimensioned, but not related to other plan points. In case of a number descriptor, the number code (2) or letter code (18) together with the digital value of the number or the several codes of a letter string will be returned. Other control codes and alternative descriptors cause only a return of the I-code and appropriate flag setting. END-OF-FILE is particularly returned by special flag setting.

Figure 5:
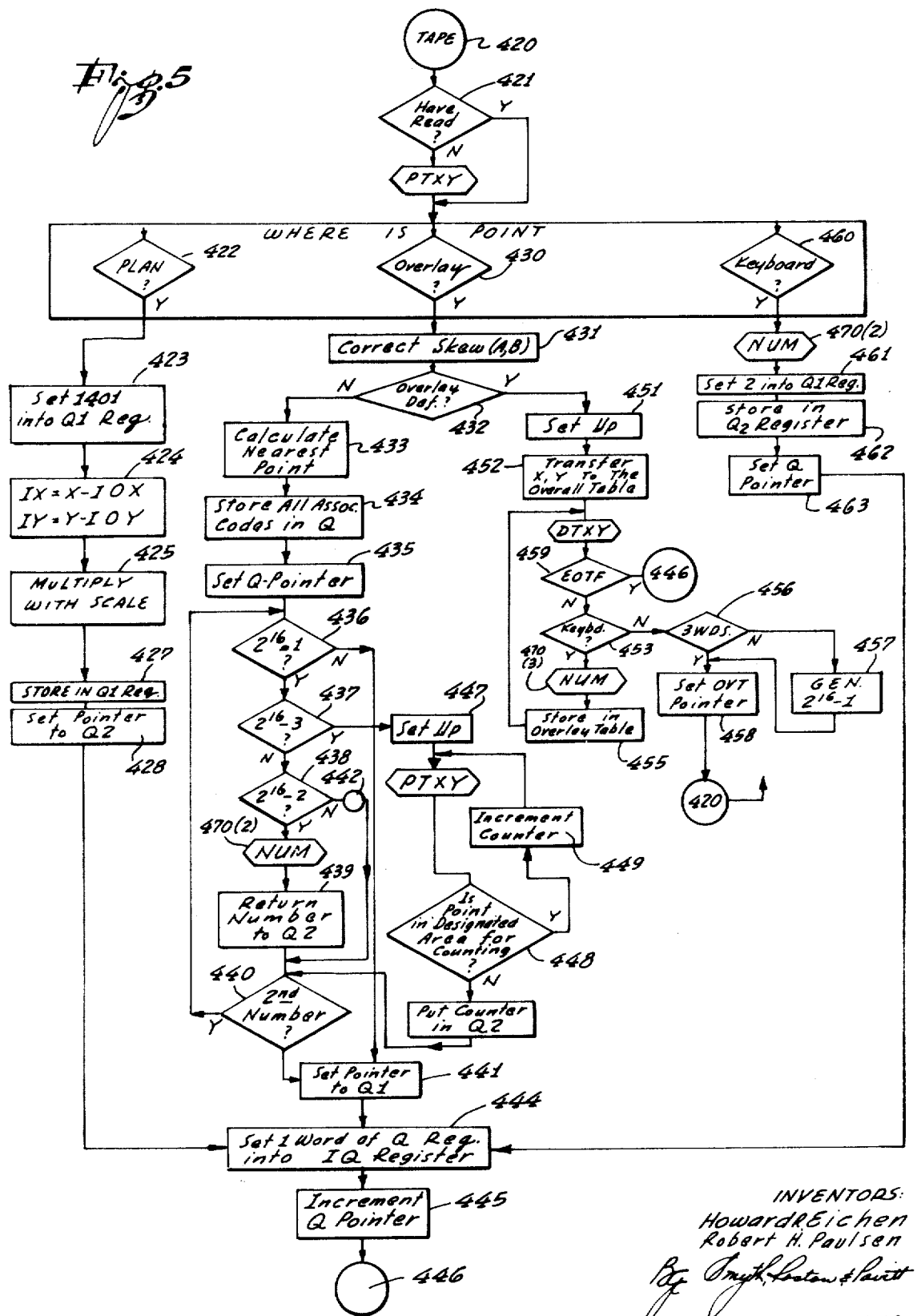

The TAPE routine to be described next with reference to FIG. 5, is not exclusively used as a subroutine 420(1) within the READ routine of FIG. 4. When TAPE is entered at point 420, at first it is determined (box 421) whether or not four frames constituting a coordinate pair have been read already from the tape, and are held in a suitable buffer that have not yet been processed further. This may occur as often various routines and subroutines require reading of the next coordinate pair from tape in order to determine continuation or exiting from loop operation or any other particular association or lack of it as to previous coordinate pairs read and processed. If such association or rule for continuation cannot be established, such a routine or subroutine will exit at that point leaving the coordinate pair read in buffer without further processing. Thus, if later on the TAPE routine is called, it may be required merely to process and evaluate this pair of coordinates. Whether or not this is so is represented by suitable flag setting.

If it is decided at box 421 that a coordinate pair has not been read, the PTXY subroutine is called. Otherwise, the PTXY subroutine is called. Otherwise, the PTXY subroutine is bypassed. These X and Y coordinates presently or previously returned by a PTXY are now tested as to where they are. If X is smaller than X1 (see FIG. 2), the point is in the plan area and this will lead to a branching of the program along the YES branch of box 422. If X is larger than X1 and Y is also larger than Y1, then the point is in the overlay area and the program proceeds as per box 430-YES. If X is larger than X1 but Y is smaller than Y1, the point is in the keyboard area and the program proceeds along 460-YES. Accordingly, the subroutine will continue along one and only one of three branches.

Assuming that the X and Y coordinates as read are returned by PTXY are in the plan area, the interrogation as per 422 will branch to the next operation which is listed in box 423. Pursuant to that operation, the location and geometric descriptor code 1401 is generated. This is a particular I-code falling within the continuum of two-number descriptor identification codes generally, but being exclusively used as geometric and location descriptor identification code. This code is fed into the Q1 register.

The routine proceeds next to box 424 that transforms the coordinates. During initialization of the main input program a new point of plan area origin (e) and a scaling factor (distance E-F plus scale number) were defined at the desired degree of accuracy. Therefore, new coordinates IX and IY are now calculated by arithmetic process, using the coordinates of point E denoted IOX and IOY. The new coordinates, IX and IY, have E as origin. Next, these new coordinates are multiplied with SCALE as was established in the initialization phase of the program (see box 315 in FIG. 3a). These, doubly processed or transformed coordinate values are, therefore, normalized on the basis of SCALE. They are, however, still endowed with inaccuracies as they may have resulted from inaccurate use of the pointer pen but relevant corrections as to that aspect are not carried out as part of the TAPE routine.

As per box 427 the two transformed coordinates are placed into the Q2 and Q3 locations of the Q register, and the Q register pointer is set to location Q1 (box 428). All of the various branches of the TAPE routine will reach box 444 in the regular mode according to which the first word of the Q register, i.e., the content of Q1, register location is set into the IQ register. In the present case, the Q1 register location holds the plan location descriptor code 1401. The Q pointer is incremented as per box 445 and the subroutine exits at 446.

Assuming that in the beginning of the TAPE routine it was found that the coordinate pair read from tape pertains to a point within the overlay area, the TAPE routine will proceed along 430-YES, to box 431. It will be recalled that in the initial phase of the main program the particular position of a descriptor overlay, such as 211, when in the overlay area was accurately defined by touching points A and B in the overlay. The input program, as per box 303, in FIG. 3 calculated a matrix defining overlay misalignment corresponding to the deviation in coordinate values as between hypothetical point A* and B* and points A and B. As all coordinate points listed in the overlay table currently resident in core memory are normalized to these points A* and B*, any point read from tape and having coordinates within the overlay area must now be corrected in accordance with that misalignment in order to permit establishing proper correspondency between touched points and the overlay table. That correction of the coordinate values is carried out as per box 431.

After having corrected an overlay point, it is determined (box 432) whether or not the system is in the overlay define mode. We will describe the overlay define mode somewhat later, and we may presently assume that the decision made as per box 432 is negative so that the program proceeds to box 433. In accordance with the operation called for here, the nearest point is being calculated. Nearest point within this meaning must be defined more fully.

The overlay table currently resident in core memory shows association between particular points in the overlay area defined earlier in an overlay define mode operation on one hand and descriptor identification codes and other relevant codes and numbers associated with such an I code (see FIG. 1A) on the other hand. After having found that the particular coordinate pair read from tape is in the overlay area and has been corrected for overlay misalignment (box 431), that corrected point may still not have a precise duplicate in overlay table because the user may not have touched the center of a circle 212 (FIG. 2a); moreover, the overlay points as so identified in the overlay table may not be themselves define the precise centers of circles 212 in an overlay. Therefore, the overlay table must be searched as between that point therein that comes closest to the point as read and A-B-skew corrected.

The operation per box 433, provides plural calculations, to determine whether the coordinate pair that has been read from tape and AB corrected, comes within a predetermined minimum (radius of a circle 212) to one of the coordinate pairs that are defined and represented in the overlay table. In essence, the operation as per box 433 causes all X and Y pairs represented in the overlay table to be compared with the A-B corrected pair taken from tape, until one pair that meets the criteria of minimum deviation is found. If no such point is found, an error situation is present and dealt with separately. Having found such a point, the I-code associated in the overlay table with the coordinate pair so found, and additional codes if any, are stored in the Q register (box 434), and the pointer for the Q register is set to Q2 as per box 435.

We will now describe several special situations and cases that may occur and are evidenced by particular numbers that may be returned in association with an I code that was found in the overlay table (not to be confused with special control codes), such special numbers may be held in any of the positions Q2, Q3, etc. We distinguish here between different cases and it is assumed that at the completion of box 435 operation, the various possibilities are sequentially tested, i.e., presence of any one of the several special numbers in Q2, Q3, etc. register portions is tested in sequence, beginning of course with Q2. The sequence of these tests is of no importance, nor is the number of different possible control numbers of critical importance; we describe here the most important ones only.

The particular control numbers used here are basically arbitrarily chosen, but they are high enough to be out of the range as normally used for I codes and also higher than any of the possible XY coordinate values or any other numbers that can reasonably be expected to be used. (This is a user constraint and of no significance if the word format is sufficiently high). It was already mentioned above, and is repeated here, that the special numbers may be close to the upper end of the total range of numbers used within the word format, i.e., they may be close to $2^{16}$.

A first one of such control numbers that may be found in Q2 (or Q3) is $2^{16}$-1. This number is always placed in Q2, when there are no describing numbers associated with an I-code, or $2^{16}$-1 is in Q3, if there is only one describing number. A generalization is conceivable here. The descriptor identified through a pair of overlay coordinates, may well have more than three related codes, e.g., there could be three, four etc., number descriptors. It is practical, to use the control number $2^{16}$-1, whenever the total number of codes and numbers etc. associated with a description point is not a multiple of three.

Thus, when test 436 detects $2^{16}$-1 in Q2 (at first), the routine proceeds again to box 441, causing the pointer to be reset to Q1, and again box 444 is reached, to copy the content of Q1 i.e., the I-code of the detected description code, into the I-code section of IQ register.

If the control number found in Q2 is $2^{16}$-2, the test as per 438 will so indicate. This particular control number is used to indicate that the particular quantitative descriptor, whose I-code is currently held in Q1 register, is a descriptor that requires the keying-in of the first describing number. In case of a one-number descriptor, it will be the only one. In other words, if a user had touched within the overlay an encircled point for such a number-descriptor, appropriately defined and labeled on the overlay, he knows that he has to key-in subsequently the describing number (or two of them as the case may be). As to the overlay table, that fact is recognized that not a describing number but the control number $2^{16}$-2 is in the place next to the particular descriptor I code. Therefore, if the test per box 438 is affirmative, the subroutine NUM 470(2) is called. This subroutine will be described later with reference to FIG. 6. According to the subroutine, coordinates are read from the tape that relate to the keyboard table, and this routine returns a number (if not, there is error). The number may be appropriately dimensioned if that is necessary, etc. That number is now set into Q2 register (box 439) and the Q pointer is advanced. The program will also arrive at this point if none of the special number tests results in an affirmative answer. The plurality of tests are symbolically represented by 442. A negative answer to all tests includes, e.g., the case that the overlay table did contain the first describing number itself.

The location Q3 may, at that point, hold still another number. If so (440-Yes) the subroutine loops back to entry at 436. If the I-code was a one-number descriptor, the content of Q3 will be $2^{16}$-1, the pointer will be reset to Q1 as per 441 and the operation of box 444 is carried out again. If the I-code was a two-number descriptor, the program proceeds along 436-NO. In case the second number is implied and part of the word set of the particular two-number descriptor, the interrogation sequence will pass through 442. Otherwise, the particular operation called for a special number is carried out to find the second describing number.

One can see here the versatility of the system as the two-number descriptor may have one-number implied, i.e., one of the describing numbers is already in the I-core table and is returned from there to the Q register in the appropriate position while the other number had been keyed-in to replace the control number $2^{16}$-2 in that position. The number itself has to be derived from the tape through the NUM routine.

Another special number that may be detected in one of the Q2 and Q3 locations as being appended to a descriptor I-code is, for example, the number $2^{16}$-3. The interrogation as per box 437 now leads to a special branch. This is a subroutine which is not based on keying of digits but on a counting process. The counting process may simply involve touching a special designated area within the tablet which the user has to touch as often as he wishes to count. It is convenient, but by no means restricted, that in such a situation he should merely touch the plan area anywhere. Thus, if he has touched a point in the overlay area that requires by the definition such subsequently counting, he will subsequently touch points in the plan area and they will not be interpreted as plan points.

One can see here the reason for this provision. For example, there may be a need for counting the number of corners, of walls, windows, special points, etc. in the drawing placed in the plan area. The user simply takes a pen and proceeds in the counting process by touching these points one after the other. After he has touched the points he has, in fact, counted them. The tape therefore will hold plural coordinates within the plan area but these points have no immediate geometric significance here. They may have already been defined as plan points and were so recognized as a geometric description, but in this case they a re-used as a kind of mental crutch, and touching these points was done only as an easy expedience without intended geometric significance, merely as an identification. Thus, touching anywhere in the plan area, resulted in a counting pulse.

Therefore, if an I-code is encountered as being associated with $2^{16}$-3, the program moves from the inquiry as per box 437-Yes to certain set up and flag settings to be performed as per 447. Next, the PTXY routine is called. Following the return of the coordinates, it is merely tested box 448, whether or not the coordinate points are in the area designated for counting. For example, box 442 merely tests whether X is smaller than X1 (definition of plan area). If the answer is affirmative, a (software) counter is incremented as per box 449, and the program loops back to call again for PTXY, reading the next coordinates from tape. Finally, a coordinate pair will be encountered that is outside of the plan area. Note the rule, a plan point must not be truly defined immediately following such counting. The overlay, usually a general qualitative descriptor, is to be touched prior to defining any plan points! However, this is no constraint as generally a qualitative descriptor will precede (as far as keying-in sequence is concerned) the touching of plan points so as to define at the outset the meaning of these points! A no on 448 breaks the loop and the counter content is transferred to Q2 as per 450 (in lieu of the number $2^{16}$-3) as describing number and the subroutine goes to 441.

It should be noted that actually this last situation is an example alluded to briefly above (421-Yes) in that the TAPE or READ tape routine may be called for in order to get a pair of coordinates when, in fact, the next coordinates have already been read and only some processing is required which was interrupted for some reason. Such is the case when the loop 448-449-PTXY is broken. A pair of coordinates has been read at that point and found to be outside of the plan area. A flag is set and the pair of coordinates which are of different significance will be processed later when again the TAPE routine is called, anywhere in the main program. Presently the TAPE routine exits.

In the preceding paragraphs, we have described routine operation and execution when a point read from tape is a plan point (422-Yes), or an overlay point (430-Yes), without overlay define. The relevant data, I-code and plan coordinates, or describing numbers are held in Q register, the Q-pointer is set to Q1. We now have to consider that the point touched by the pen is in the keyboard area, i.e., the inquiry as to box 460 leads to the "keyboard" branch of the TAPE routine. Accordingly, the subroutine NUM 470(3) is called. Upon return of the number, the number descriptor identification code 2 is generated and set into Q1 (box 461) if such a number is returned; a different code (18) is generated if the return is a string of letters. The number itself as returned by NUM is stored in Q2 register as per box 463. The Q pointer is set back to Q1 as per box 464. The I code 2 is set into the I code section of the IQ register 444, the Q pointer is incremented at 445 and the routine exits at 446.

Figure 3B:
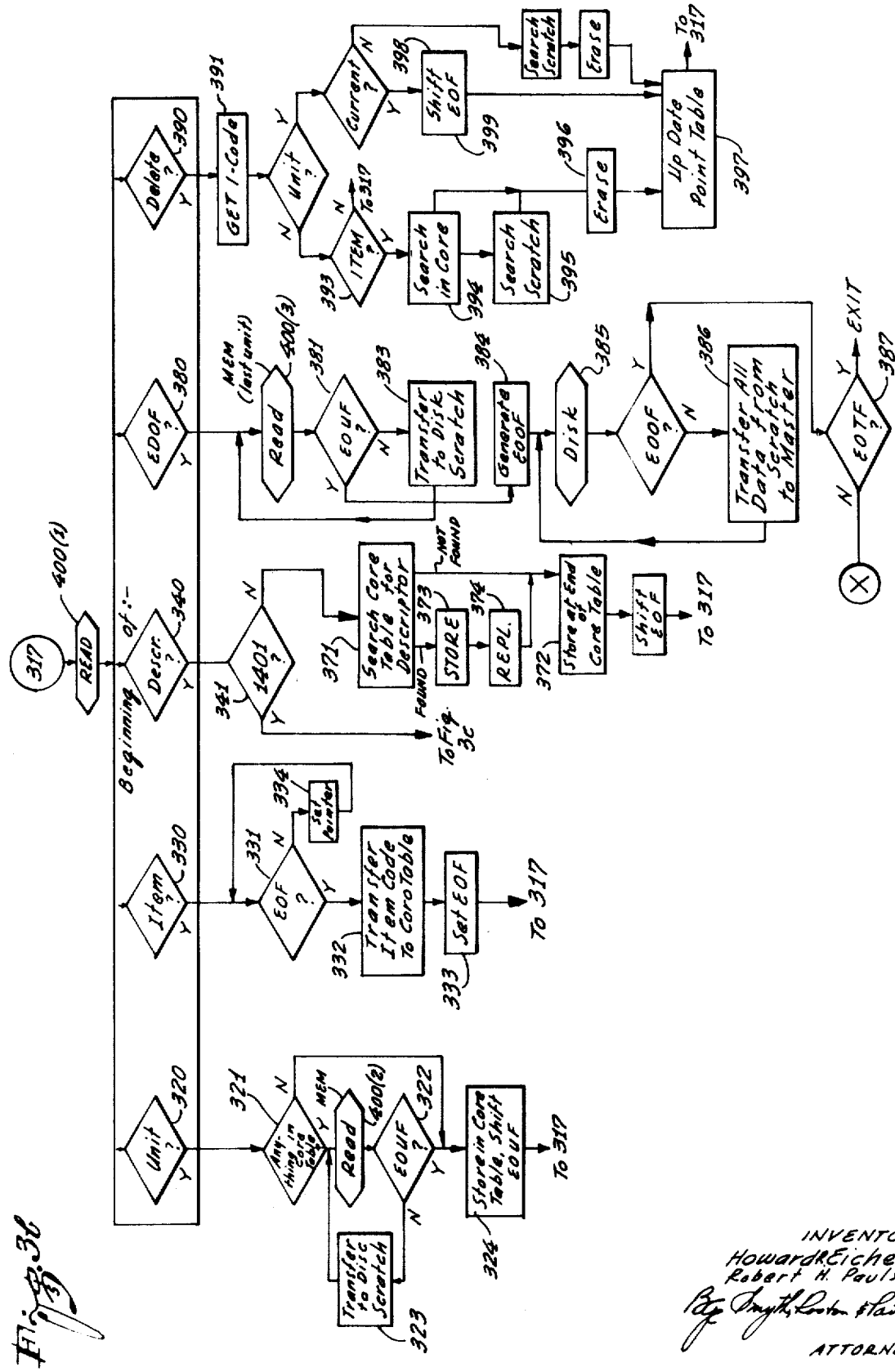

Before describing the overlay define mode with reference to FIG. 3 and 5, the NUM subroutine 470 referred to repeatedly above should now be described in detail with reference to FIG. 6. As the routine itself is entered, via a loop return point 471, an inquiry as per box 472 is made whether or not there is a pair of coordinates from the keyboard area that has already been read but not processed. If not, the PTXY routine is called and, of course, the coordinate pair returned must be in the keyboard area. If not, the routine exits immediately as per 474. This is the normal way of exit for the NUM routine. The NUM routine 470 will always read the next coordinate pair from tape and will continue to do so until it encounters a point that is not in the keyboard area.

If a coordinate pair in the keyboard area has been read (471-YES) or the coordinate pair now read is in the keyboard area (473-YES) a skew correction is needed again as per box 475. It will be recalled that the position of the keyboard overlay in the keyboard area was defined by keying in initially points C and D so marked in the keyboard overlay. As a consequence, a matrix for correction values was calculated (box 304 of main program) which represents the relationship between the keyed-in points C and D and a hypothetical pair of points C* and D* in relation to which the keyboard file and the coordinate points used therein are defined. The matrix that was calculated as per 304 in the main program, FIG. 3a, represented misalignment as between C, D and C*, D* The need for correction arises now, upon entering the NUM routine, and box 475 calls for correction of the misalignment of the coordinates in the keyboard area as read, so that corrected coordinates permit better correlation with XY coordinate points as used in the keyboard table, resident in core memory.

After having made this correction, inquiry is made as per box 476 whether or not the computer runs in the keyboard define mode. We will describe the keyboard define mode later. Presently it is assumed that the keyboard has already been defined and the routine proceeds through 476-NO to box 477. Pursuant to the operation called for in box 477, the keyboard file is sequentially read and each XY coordinate pair therein is compared with the pair of C-D corrected coordinates as presently processed. For reasons analogous to the tolerances which can be observed in touching points on an descriptor overlay similar latitude is permitted here, as each keyboard number point is not defined by a point but by a circle around a point. When the nearest point defined in the keyboard table is found, the character associated with that nearest point is set into a buffer, as per box 478.

Assuming that the character is a digit, inquiry to that extent, as per box 479, will be affirmative and the number then held in the N register is multiplied by 10 and the new digit held in a buffer is added; the sum is returned to the N register whereby, of course, the new digit occupies the lowest position. This arithmetic is carried out as per box 480. The routine loops back to 471, the next coordinate pair is read from tape and if this is not in the keyboard area, again the routine exits as per 473-474. It can be seen that sequential number entries in the keyboard are processed sequentially with gradual accumulation in the N register.

It was outlined above that numerous dimensioning factors may be defined through appropriate "keys" in the keyboard area. That factor or a code is returned from the keyboard table in case the keyboard coordinate pair presently processed is so associated. Assuming that as per inquiry 481 a multiplier is found, in lieu of a regular digit, the operation as per box 482 causes multiplication of the content of the N register by the dimensioning factor.

By an example, a regular entry of numbers may be assumed to define dimensions always in one-eighth inch. However, an entry may be in inches. Therefore, the user touches a point in the overlay area marked "inches". The corresponding entry in the keyboard table finds the factor 8, and now the number in inches held in the N register is multiplied by 8 to normalize all numbers to a common scale. This may be the operation carried out as per branch 481-YES-482. Another key on the keyboard overlay may indicate "feet." This then may lead to a branch (not shown) parallel to 481-482, causing the content or N-register to be multiplied by 96, to normalize the number in units in one-eighth inch.

If the character associated in the keyboard table with a keyboard point was found to be a letter having a code different from a digit or a scale code, the inquiry as per 479 and 481 were both negative, but the inquiry as per box 483 will be affirmative. The character code will be stored in a different register called register CN as per box 484 and again the subroutine returns to 471 as before.

It should be mentioned that upon exiting from NUM, numbers, or letter codes, held in the N or in the CN register respectively are not in any way associated with any descriptor code. Such a descriptor code is generated only in case the NUM routine was called as a subroutine pursuant to execution of the TAPE routine, and there only via the branch 460–470(2).

KEYBOARD AND OVERLAY DEFINE

We have not yet described in each of the TAPE and NUM routines the particular branches respectively related to the overlay define mode and to the keyboard define mode. Both the operations necessary prior to using the descriptive overlay and keyboard overlay areas. For purposes of such overlay and keyboard defining, the main program is used in the respective modes. Therefore, we return temporarily to FIG. 3a and shall subsequently describe the define-branches of TAPE and NUM routines.

The mode is appropriately defined by a card fed to the card reader of the computer. It is assumed now that a descriptor overlay to be defined is placed in the overlay area, and the keyboard overlay is likewise placed in the keyboard area. The keyboard define mode must always be the first mode used, and the purpose thereof is to generate the keyboard table. Strictly speaking, for keyboard define a description overlay is not needed, but any tape prepared requires an initialization the keying-in of four points as points A through D, so that a descriptor overlay, undoubtedly to be defined later, may already be placed in position as well.

In the initial phase, from box 300–301 via acquiring points A and B through PTXY (twice), the program arrives in box 303. For purposes of defining an overlay (i.e., for generating an overlay table and file) the same overlay will be used, and will be used subsequently, after the overlay table has been established. Therefore, the procedure as to alignment is always the same and as per 303 a correction matrix for misalignment between the placed overlay and the inherently included system parameters, i.e., the coordinates for A* and B*, is calculated. The same is true for reading the next two points C and D, and a keyboard overlay misalignment correction matrix is calculated as per box 304. One can see here a possible alternative. The points A through D entered during any define mode may be used as subsequent reference points A* through D*, and the initial system parameters are correction matrices having unity in all positions prior to "define."

The system starts always with the keyboard define mode. Therefore, the inquiry as per next box 305 will, in this case, be affirmative and TAPE as per 420(2) is called. Now, we turn again to FIG. 5. The next coordinate pair will be read from tape and will be a keyboard area point. The TAPE routine, therefore, branches via 460-Yes to 470(3) and the NUM routine is called (See FIG. 6). CD skew is corrected as per 475 for this first keyboard entry. The inquiry as per box 476 will now be affirmative and the NUM routine proceeds to box 485.

Before continuing with the description of the keyboard define mode processing, we shall describe briefly the instructions given to the user how to proceed with the keyboard defining. The user is told to touch the "keys" in the keyboard overlay in their natural order. Therefore, the user will have touched the "-zero" key with the pen followed by touching the "one" key, the "two" key, etc., followed by additional scaling and finally he will have touched the end-of-entry key. Therefore, the first entry in the keyboard area detected subsequent to coordinates which define necessarily points A,B,C,D, the keyboard area and point that causes branching 420–460–470(3)–472–475–476 defines the zero key.

As per box 485 a software counter is set to count state zero. Having done that, the counter content and the xy coordinate values of that first keyboard entry are set in mutual association in a first word set location in memory (box 486). The first entry in the keyboard table (FIG. 1b) is made. Actually, the addresses of core memory which will normally be used for the keyboard table when resident in memory are also used during keyboard define; presently that keyboard table is generated.

As per box 487 a pointer in the keyboard table is set to the next word set location. At 488 a decision is made whether the keyboard has been completely defined. This is simply determined by whether the table pointer has arrived at a particular location within the core memory and if it has not yet arrived at this particular word set location, the keyboard is not completely defined. Therefore, a negative answer to that inquiry as per box 488 returns the routine to point 471. The next keyboard entry will be read from the tape as per PTXY, and the coordinate pair returned is of course now the key which in the future is to represent and define the "1" key. The counter is incremented by "one" as per box 485, the number "1" is loaded into the next location of the keyboard table in association with the x,y coordinate pair of that second keyboard entry, etc. This mode of operation continues until all the numbers have been defined.

The same may be true as far as the letters are concerned in that letters in any order such as the alphabetical order or a typical typewriter order, etc., are given correspondingly ascending identification codes to be loaded in sequentially addressed word set location in the core table and in association with the respective keyboard point coordinates. The end of the keyboard define operation is actually signalled by the pointer reaching a limit and the inquiry box 488 now breaks the loop, the keyboard define mode flag is reset per 490 whereupon the NUM routine exits on 474.

NUM was called as a subroutine during TAPE (420(2)) but NUM returns no data as nothing is set into N-register so TAPE exits likewise. Next in the main program is box 306 and the keyboard table is copied into the keyboard file.

It may have been part of the flag setting operation that not only is the keyboard define mode terminated as per 489 but the flag setting is changed to the overlay define mode. The main program now proceeds to call again NUM, but now directly as per 470(1). Alternatively, in case the keyboard has been already defined previously in the overlay define mode the program will arrive at 470(1). It will be recalled, that the user was instructed to key in the overlay identification number, either directly after entry of points A,B,C,D or after completion of keyboard define entries. That identification code, for the overlay about to be defined, is returned upon execution of NUM 470(1).

The inquiry as per 307 branches along the yes path and the overlay define operation begins. TAPE is called after 420(3). At the closing phases of NUM-470(1), a coordinate was read (PTXY in FIG. 6) and found not to be the keyboard area. In reality that is the first point in the overlay area. Therefore, as TAPE is called as per 420(3) in the main program, TAPE will branch to 430-Yes (FIG. 5). After SKEW correction as per box 431, TAPE therefore will branch along 432-Yes.

The proceedings are now in effect a replica of instructions given to the user as to how to proceed for defining an overlay. The user has been instructed to proceed as follows. He will use a prepared descriptor overlay with designated and labeled encircled points. The labelling describes the different descriptors he wishes to identify by way of encoding. For this purpose the user has in front of him a written table in which the particular descriptors are listed as to their codes. He then takes the pen and touches a point on the overlay and thereby designates that particular point within the overlay area as a descriptor point. The first point so touched results in a pair of coordinates that caused the program to the branch and to arrive at 431-Yes.

Next the user uses the pen and keys-in the descriptor identification code chosen for that overlay point. He will also key in additional numbers if any, such as the describing numbers, control numbers, etc. He does not have to key in the control number $2^{16}-1$. Next, he touches the next point of the descriptor overlay and subsequentally keys in the I-code number thereof etc. Now, we return to FIG. 5.

There is initialization, flag setting, etc. i.e., setup as per block 451, which includes the loading of the overlay define number returned by NUM 470(1) into the overlay table now to be generated. This then is followed by operation described in box 452: The particular, skew corrected coordinates X and Y of the point that had been touched first in the overlay area is loaded into a first two word position of the first word set location in the overlay table (see FIG. 1a). Note that there was no further processing of the coordinates up to that point in the program. Next, PTXY is called to read the next pair of coordinates, which usually is in the keyboard area and represents the first digit key of the I-code to be assigned to the previous overlay point. The END-OF-TAPE test as per 459 is of course negative, but the inquiry as per 453 will be affirmative and NUM 470(3) will be called. NUM will process in most instances several pairs of coordinates i.e., several digits as the code numbers are in most instances four digit numbers (the exception are the control I-codes).

NUM returns the I-code and the number is now stored in the overlay table as per box 455 in association with the X coordinate made before. This association occupies only the word location in one (the first) word set location in the overlay table. The routine loops back to call again for PTXY. Another number may have been keyed in. For example, the descriptor number or substitute numbers such as $2^{16}-2$ or $2^{16}-3$. If the next entry is not in the keyboard area it will be decided whether a total of three separate numbers have been read and processed since the last entry in the overlay area. The decision is made in box 456.

Whenever a point in the overlay area is associated with less than three additional numbers that have been keyed in i.e., whenever the I-code represents a qualitative descriptor or a one-number descriptor, less than three numbers have in fact been entered via the keyboard and for that situation the closing control $2^{16}-1$ is generated as per box 457 and stored in the second or last word locator of the current word set locator in the overlay table. The overlay table pointer is now set as per 458 to the next word set address in the overlay table and the routine loops back to 420.

Obviously this program loop will continue as long as the overlay is being defined. At the end of that overlay defining operation there will be an End-Of-Tape file marker and the test on 459 will so find. The TAPE routine exits as per 446, and calls on 308 in the main program (FIG. 3c). Box 308 deviates, generally copying on the control of the overlay table in the overlay disk file 155 and the program stops.

MAIN PROGRAM - DATA POINT PROCESSING

We now return to point 317 in the main program, which will be reached only in the normal mode. In order to recapitulate, the keyboard table and an overlay table, are defined at this point and resident in core memory. Misalignment correction matrices for descriptor and keyboard overlays are established and a 0 point (E) as well as a scaling factor are ready for plan point scaling. In the operate mode, the tape portion processed thus far held our points A through F and the keyboard points for the descriptor overlay identification number. The tape portion not yet processed will contain the data proper in form of coordinates of points from the various areas in the tablet.

In a typical example, the next point that was touched will be in the overlay area, for identifying a unit descriptor (e.g., "Insert Wall," see FIG. 2A); followed by one or several points in the plan area for identifying the location (e.g., the corners of the wall); followed, possibly, by several "key" points in the keyboard area to define the distance between the corners more accurately than is possible by plan area pointing alone; followed by one or several points in the overlay area for quantitative descriptors, each or some possibly followed by "key" points in the keyboard area, giving the number or numbers for the quantitative description needed; followed for example by a point in the descriptor overlay area to insert an item (e.g., insert window); followed by plan points locating that item, for example, in relation to the wall previously defined; followed by one or several descriptor overlay points for qualitative descriptors; followed by a descriptor overlay point for insertion of another item (e.g., another window or door) followed by plan points for the location of that item, etc.

After all items for the unit have been inserted and described in that manner, there will be another descriptor overlay point for another unit (e.g., the same "wall insert" point has been touched) followed by (and thereby identified by) plan points locating this unit particularly etc, etc. This sequence of points is closed by the coordinates of the overlay point used to identify END-OF-OVERLAY followed by the coordinates of a point A pertaining already to a new descriptor overlay that has been placed in the overlay area. Alternatively, there may be a END-OF-TAPE marker placed through manipulation of the punch to indicate complete termination of input operation of the tablet.

Processing of these points by the main program always returns to program point 317 in closed loop operation as long as the same descriptor overlay is used. Beyond that point there is a call for READ, denoted here 400(1). Not all points are read or their reading processed by the READ routine at that location, but READ 400(1) will always be the one that returns (1) a unit I-code, (2), an item I-code, (3), the END-OF-OVERLAY or END-OF-TAPE code, see box 413 FIG. 4. In case coordinate pairs are found associated in the overlay table with any such code, the program will loop back to point 317 and READ 400(1) will merely process and assembly, etc. the data on these points. It will be recalled that READ may be called as a subroutine even though a coordinate pair has already been read from the tape, but the READ routine particularly processes these coordinate points and returns the respective I-codes.

Other qualitative or any quantitative descriptor I-codes may be returned by READ 400(1), but not exclusively so, because READ is not only called at this point in the program, but in many other points therein. In any event, upon exiting from READ 400(1) an I-code is in the I-code section of the IQ register. In the following it will be described how the program proceeds beyond READ 400(1) upon return of any of the various I-codes. The returned I-code is subjected to various tests (320, 330, 340, 360, 380 and 390) carried out in any sequence. Assuming the program recognizes the I-code to be a unit identification code, the program branches along 320-Yes. This may be the first time that the coordinate points associated with a unit code has been detected on tape. That means that the I core table does not include any information related to a previous unit. On the other hand, the core table may contain accumulated I codes, describing numbers, plan points, etc., related to a previous unit; box 321 makes that decision. If the core table does contain data related to a previously put-in unit, the I core table is read by calling READ memory as a subroutine 400(2).

Reading of the core table is carried out in word sets as described. Therefore, the data pertaining to a unit are read out of core table in a sequence of word sets. An end-of-unit-file marker is always placed in the I-core table as respective last entry. As long as that marker is not detected (322) each word set taken from the I-core table (and held in IQ register) is transferred to the scratch file 154 by transfer operation as per box 323. The routine loops back to call again READ-MEM 400(2), etc. In other words, I-core table is step-by-step emptied and its content is word-set by word-set transferred to the scratch file 154 until the end-of-unit-file (EOUF) marker is encountered.

As the program proceeds now along 322-Yes, the transfer loop is broken and the new unit I-code is placed into the core table. An end-of-unit-file mark is placed in the next word set location by operation of box 324 whereupon the program returns to point 317.

If the core table did not contain data relevant to a previous unit, because, for example, the present unit is the first one described, then the transfer loop 400(2), 322, 323 is by-passed (321-no), and the unit code is stored directly in the core table with the EOUF marker placed in the next word set location as before.

After a return to program point 317 which is not necessarily the return described in the last paragraph, and after reading the next coordinate from the tape as per READ 400(1), the coordinates may result in a presentation of an item descriptor identification code so that the program branches to 330-yes. An item may, for example, be a fireplace, a window, a door, etc. pertaining to or relating to the unit, for example the wall previously described, and constituting a part thereof.

As per box 331, it is inquired whether the I core table pointer points to the position of the word set location in the core table that holds the EOUF marker. If in fact, the pointer has that position, the item code is set into that position and the EOUF marker is shifted down by one word set position as per box 324. Subsequently, the program again returns to point 317.

If the core table pointer was not at that position, then the pointer is reset as per operator 334, step for step, until the pointer has correct position and then the transfer of the new item I code takes place. The item code is used as merely a demarcation line and identification for the subsequently placed location descriptors and the possibly qualitative and quantitative descriptors for that item.

When the user has completed inputting the relevant data in conjunction with a particular overlay, he will touch the particular encircled point in the overlay marked END-OF-OVERLAY-FILE (EOOF), provided he intends to use another descriptor overlay subsequently and in that case the next entry on tape will be the alignment point A followed by alignment point B, etc. for that new descriptor overlay. If no such use is intended, but if in fact the operation is terminated as to the particular object in the plan area, he will place an END-OF-TAPE (EOTF) marker on the tape, for example, by manipulating the paper punch to that extent rather than touching the EOOF marker on the overlay. In either case, upon processing, READ 400(1) will return either the EOOF marker I-code or the EOTF identification code. In both cases inquiry as per 380 will branch along 380-yes, but if there was an end-of-tape code, a flag will be set to that extent; that particular flag will remain reset if there was only an end-of-overlay. In either case, the program calls for READ-MEM 400(3).

The data relevant to the last unit are still in the core table so that the I-core table is read until as per box 381 until the end-of-unit marker (EOUF) is detected. EOUF is not detected a word set read from the I core table is transferred to the scratch file 154 as per box 383. This operation is similar to the transfer loop 400(2), 322, 323 outlined above. After EOUF is detected the loop is broken 381-yes and an end-of-overlay-file marker is generated and as per box 384 that marker is placed onto the disc to marker on the disc the end of the accumulated processed input data. This completes the data transfer to the scratch file as to processed data pertaining to a particular overlay.

As per box 385, that entire content is read word by word from scratch and transferred to the master file, box 386, until the EOOF marker again is detected on the disc file. As per inquiry 387, it is determined whether or not the end of tape flag was set. If not, the program returns to point X and the main program will now continue taking the next point from tape which is alignment point A of the new overlay. If there was an end-ofntape marker, the program exits and turns the computer over to terminating procedure or other uses.

In the foregoing we have described how the main program is terminated, how accumulated data are transferred on a unit by unit basis from the I core table to the scratch file, and how the item codes are used for placement in the core table as a kind of divider therein. We now turn to the processing of tablet points that define qualitative and quantitative descriptors, plan points and related numbers. Therefore, the identification code returns by TAPE 400(1), may be a descriptor and the program will branch along 340-Yes.

At box 341, an inquiry is made whether the I-code is actually the location descriptor I-code 1401 or not. If not, the program proceeds to box 371. The rule now exists that a qualitative descriptor of the same type may not be entered twice for the same item or unit in order to prevent conflicts (e.g., "wall height," "stud size," etc. should only be defined once). Therefore, the operation as per box 371 searches the current I core table whether or not the same qualitative descriptor code is found under the entry process sequence for the current item, or before an item was specified, among the qualifying descriptors of the unit currently described. If no such a descriptor is found, the program proceeds to 372, and the I-code of the descriptor and all describing numbers held in the IQ register are copied into the I core table. At 374 the EOUF marker is shifted by the one word set location and the program returns to point 317.

In case a similar descriptor is already in the core table under the same item or unit as qualitative or quantitative descriptor thereof, then that descriptor I-code together with the describing number (or numbers, if any) if temporarily stored (box 373). The new I-code with its describing numbers replaces the previous one, box 374, and the previous entry is placed at the end of the core table as accumulated thus far. It will be up to the user program to deal with the duplication of such entries and to interpret it as error, or as an intended alternative in case the user program requires optimization and adaptation.

The return and placement of descriptors are an important part of the program and operation. In summary, such return usually originate in that TAPE 420(1) as executed as part of READ 400(1) encounters a coordinate pair of a descriptor overlay point found in the overlay table to be associated with a quantitative descriptor. The I-code thereof was returned ultimately into the I-code section of the IQ register. Additionally, the descriptor describing numbers were accumulated in that register either through extraction from the overlay table itself in case such numbers were already stored therein in association with a particular I-code. Alternatively tape points were read and interpreted as number or numbers to be used as the describing number(S) and then placed into the other section of the IQ register. As per box 372 or 373, the accumulated content of the IQ register (I-code and describing numbers) are placed in the designated location in the core table.

We turn now to the description of that branch of the program executed, when READ 400(1) returns the location descriptor code 1401. It will be appreciated that individual points are rarely entered in the plan area in geometric isolation from each other. Rather, points are usually used to mark the end points of lines. Thus, coordinate pairs in the plan area appear usually in groups of two (or more for reasons below). The program branch on 341-Yes is, thus, provided for processing such sequential groups of points. Moreover, it is a salient feature of the system as programmed that the distance between two points on the plan and as it results from their placement, can be corrected or particularized to any degree of accuracy within the format and resolution constraints of the computer, by keying-in the particular value for that distance, and the coordinates of one or the other of the two plan points will then be adjusted automatically to the specification of that distance. Therefore, a group of plan point coordinates may be accompanied by keyboard points, and they have to be processed in relation to the plan points.

As was outlined above, there are several different working areas in core memory 12. In one area, called point array, there will be accumulated the points of a group and adjusted before being inserted in the I-core table with the appropriate qualitative and interpretative descriptor(s). In addition, there is a "plan point table" in which all plan points that have been used for some reason are accumulated. The reason for this is that in case the user touches again a plan point, but not exactly where he had touched the "same" point previously (even though he so intends), an automatic correction to the coordinate pair as stored in the plan point table is made.

The program branch following 341-Yes will be described best on basis of different situations. This branch will be entered into always from detection of the point descriptor 1401 as generated and returned by READ 400(1) upon reading the coordinate pair of a plan point that is the first one (or the only one) in a group of plan point touched as geometric description of an object in the plan area. The program proceeds to box 342 according to which the coordinate pair is transferred from the IQ register to the point array and the group flag is set to 1. Next, as per operation box 343, the point table is searched, whether that point has been used previously, not necessarily exactly that point but one close to the new one. Thus, the coordinate values of the new point are compared with all or those held in the point table, as to whether there is a difference less than a predetermined minimum, regarded as representation of accuracy tolerance in the pen and pointer use.

Assuming the point is a new one, the program proceeds to inquiry 365 testing whether the skew flag has been set. As this has meaning only for subsequent points and will be explained below, the test will necessarily be negative. As we assumed that the point is the first point of a group, the test in 344 to this extent is also negative and the program continues to call for the READ subroutine (400(4)). Assuming this routine as reading the next coordinate pair finds another plan point, and returns location code 1401 together with two coordinate values in the plan area, than the test as per 345 negative; if the previous point was new (not in point table) the test on 359 is negative and that point is set into the point table as per 358, and as to the plan point just read the loop continues through 346-Yes. The point group counter is incremented (347) and the coordinates of this second plan point are stored in the point array (368).

Again, the point table is searched for a similar coordinate pair (box 343), and it may be assumed now that the point table does contain such a point of exactly or very similar coordinates. The box 348 calls for a substitution of the coordinates of the second point in the "-point array" by the coordinates for the "same" point in the "point table," assumed to be more accurate and already fixedly related to previously geometric entries. Therefore, the routine continues to 400(4). It is tested whether the previous point (e.g., the first point of the group considered) was fixed, i.e., whether a substitute was taken out of the point table. We assumed that this was not the case for point 1, so that the program proceeds to 350 in which the X and Y coordinate values of the first and second point (as per current point array) are compared. If the X coordinates or the Y coordinates of the two points differ by an amount only regarded as being within a tolerance range of permissible inaccuracies, it is presumed that the user meant the X or the Y coordinates to be similar i.e., in this case it is assumed that the user intended the points to be aligned along X or Y axes. therefore, as per box 351, the X coordinate of the second point is used as replacement for the X coordinate of the first point. Alternatively, as per box 352, the Y coordinate of the first point is replaced by the Y-coordinate of the second point If the test as to approximately similar X or Y coordinates is negative in both instances, it is assumed that the line delineated by the first and second point is intended to have an angle to both X and Y axes. For intentionally providing for small angles that give the appearance of an error skew but are not, the route to be taken as a different one and will be described below. As per box 353 the X or Y coordinates of the first point in the pan point table are replaced by the ones provided for such substitution by operation of boxes 351 or 352.

The program continues and calls again for READ 400(6). The coordinates now read and the I-code returned may define another plan point which in this case will be a third point of the group and the routine proceeds through 346-Yes to close the loop. Alternatively, it may be assumed that upon completion of READ 400(5) a number is returned, and that number is interpreted as a dimension. Thus, upon exiting from READ 400(5), the IQ register holds that dimension and returns particularly a special IQ register. The inquiry as per 354 thus goes to the affirmative branch in representation of the fact that the number now presented particularizes the distance between the first and second plan points. This program branch is reached only when the second point of the group considered was fixed through the point table but not the first one. READ 400(5) is reached only via 343-found for the second point.

Now, as per box 355, one of the coordinates, X or Y of the first point in the point array, is recalculated to assume exactly the distance relation to the second point as called for by the value of that dimension. This recalculation is assumed to be carried out only as to one coordinate (X or Y) of the first point on basis of now identical values for the respective other coordinates produced per operation of boxes 351 or 352. The distance-corrected coordinate value replaces the respective coordinate value for the first point in both, array and point table, as per operation of box 353. If the first and second point did not have similar X or Y coordinates the number returned by READ 400(5) represents an error situation and the program proceeds on that basis. Length adjustment of slanted lines will be discussed shortly.

It is this particular step of length adjustment as described which permits the distance relation between two plan points to be made much more accurate than is possible through inputting of plan points by means of pen 22. Note, that the recalculation of one of the coordinates of the first point of a group requires correction of that coordinate in both array and point table.

Having completed this operation the READ routine is called again (400-(6)). It may be assumed now that the code returned by a READ is not a plan point but, for example, a new item code, a unit code, a delete code, etc. In this case the program will proceed to box 369 (we assume no on 361 and 363). The operation as per box 369 causes the content of the point array (2 coordinate points here) to be transferred to the I-core table, both under I-code identification 1401. The I core table pointer is reset. Also, the point use counter associated with the second point is incremented in the point table whereupon the program returns to 317.

It will be appreciated that this particular program portion will be used in loop operation for as long as there are plan points read from the tape in continuous sequence, alternating merely with keyboard area points representing dimensions. Any contour, as geometric pattern, can be outlined in that manner and properly scaled and dimensioned. At the end, all points will be stored in the I-core table under a qualitative descriptor code e.g., unit or item, that qualitatively describes the geometric pattern as defined in digitized representation of the processed plan points. Also, any two plan points may form a group and a qualitative descriptor succeeding them, may, in code, describe that the two points are not to be regarded as interconnected by a straight line but rather by a parabola, a circle, arc, etc., and a number following that description may define the necessary parameter for such curve.

Next, I shall describe briefly how the program proceeds if the second plan point of a pair is not (as we assumed above) in the point table, in that no sufficiently close point is found by the search and compare operation of box 343. The skew flat is still presumed as not set, and the test 344 is now negative as we process the second point of a pair (that may be a third or still later point of a group). The operation as per 356 is analogous to the test operation 350 and subsequent operations 351 or 352, except that now X or Y coordinate of the first point in the point array of the first point in the point array replace the X or Y coordinate of the second point therein. The program then proceeds again to READ-400(4).

The next entry on the tape may also be a dimension, so that the test at 345 has affirmative result. Analogously to the operation at 355, the new dimension is taken as per box 357 to adjust the X or Y Y coordinate of the second point in accordance with the keyed-in length dimension by taking the X (or Y) coordinate value of the 1st point in the point array, adding thereto the length dimension and placing the result as X (or Y) coordinate value into the point array as replacement for the X (or Y) value of the 2nd point therein. The program proceeds to call READ-400(7), stores the second point in the point table (box 367) and returns to 346.

Two other cases should briefly be discussed. In case two plan points read in sequence are already in the point table, there cannot be any adjustment in their relation, but the coordinate values are taken from the point table. This leads to the affirmative branch of inquiry 349. The current (second) point had just been taken from the point table (343-348-349) and the previous point (first) is assumed to have also been taken from the table. If the first point of a sequence was taken from the table, the program goes likewise from 349 to 400(4). The following READ cannot presently return a dimension (if so, there is error) so that the program loops back to 346.

It should be mentioned here, that the routine could be simplified by the user constraint, that only the second plan point of a pair can be skew corrected and/or dimension adjusted. This is equivalent to going from 348 to 400(4) directly.

I now proceed to the description of operation how a slanted line can be inputted, having only a small angle to X or Y axis, small enough to be subject to alignment correction unless steps are to be taken. The rule here is that any plan point that is not to be subjected to shifting by alignment operation (355 or 357), is to be preceded by special entry. This is the purpose of demarkation in an overlay marked "skew" (see FIG. 2a). Obviously, a previously used plan point, when touched again, does not have to be preceded by a "skew" entry, as it will not be shifted anyhow. When both points are new, both have to be preceded by a skew entry to prevent any relative alignment between them. Clearly, user instructions are simplified by the rule always to use the skew key in the overlay when plan points are not to be mutually aligned.

In case of a "skew" entry, the coordinates are in the overlay area, and the READ subroutine pursuant to which the pair of coordinates have been read, returns a special code. The READ subroutine that returns the special code, signifying that the next plan point coordinate pair (still to be read) is a point not to be skew corrected, may be READ 400(1), following a return of the program to 317 if the very first plan point of a group has been so marked. Otherwise, if any later point is so marked, the special code may be returned by READ 400(6), 400(5), 400(6), or 400(7). In either of the latter cases the return will lead to test 346 and negative branching therefrom. In case 400(1) returns that case, the test at branch point 360 so finds and enters the particular program branch at "skew" test point 361. The answer to that test is affirmative and the "-skew flag" is set per box 362. A loop is formed by calling for READ, 400(8) and the next coordinate pair read from tape should be the plan point that is not to be skew corrected. The I-code returned by READ-400(8) should, therefore, be 1401 and test 346 guides continuation of the program to storage of the point into the point array as per 347 etc. Presumably, the plan point was not previously entered (if it was, there will be no coordinate correction anyway) so that the search operation in the point table (343) is negative. At box 363, the skew flag is found set and the program, therefore, loops around alignment correction 356 to call for the next READ operation as per 400(4).

It will be recalled, that immediate length dimension adjustment was carried out in but one coordinate direction, on basis of similar values for the other coordinate direction. The simple length adjustment and dimensioning of distance between two points is, thus, limited to points that are aligned and parallel to one or the other coordinate axis. For points that are not so aligned, one could provide a routine which takes the keyed-in distance value and uses the pythagoraic rule to calculate separate $ax$ and $ay$ values, and to calculate the coordinate $x_2$, $y_2$ of point 2 from the coordinates $x_1$, $y_1$, of point 1 by the relation $x2 = x1 + ax$, $y2 = y1 + ay$. However, in the present example, it is assumed that the user has himself established $ax$ and $ay$ values for a particular distance $(= \sqrt{ax^2 + ay^2})$ and he will key them in separately, using a fictitious reference point, not to be entered as element of the geometric pattern but only for purposes of reference, in the following manner.

The user points to the first point in the plan area (coordinate pair No. 1), then he points to a marking in the descriptor overlay marked "reference" point (coordinate pair No. 2), then he points to a second point (coordinate pair No. 3), e.g., that is aligned with the first (True) point along the X-axis, but spaced apart therefrom by an $ax$. Thus, then reference point will be aligned along the Y axis with the other object point, to be entered later. Then he keys-in the distance $ax$ as dimension (coordinate entry No. 4) involving possibly several "digits" coordinate pairs. Next, he points to the second sure object point (coordinate pair No. 5) in Y axis alignment with the reference point followed by keying-in of the dimension $ay$ (entry No. 6, possible several coordinate pairs in the keyboard area).

This sequence of entries is processed as follows. The first point (entry No. 1) may be recognized as a plan point after return by READ-400(1) in the main program and via branch 340–341. the point is stored as first point entry in the point array, substituted or not, and the program runs 343-(no), 365-(no), 344-(yes), to 400(6), or via 343-FOUND, 348-, 349-no to 400(4). The latter READ subroutines return the I-code associated with the "reference" point key of the overlay area (entry No. 2). The code is recognized as special via loop 345-no, 359-no, 346-no, 361-no, 363-yes, the latter test responding to the particular reference point I-code. The reference point flag is set per 364 to make sure that the next point will not be entered as geometric descriptor.

The program continues to call READ (as per 400(8) and entry No. 3 will be returned, which are the coordinates of the reference point itself in the plan area accompanied by the point descriptor code 1401. The point will be entered in the point array as per 347. The reference point could be among the points in the point table, as a previous entry, pertaining to a different geometric delineation, but presently that point is not part of such delineation. If found in the point table, point 1 will be subjected to alignment correction via branch 348-, 349-no-, 350. If the reference point is not found in the point table, there will be alignment correction as per 356 (the skew flag must not be set on reference point use) and the reference point in the second plan point on the group.

In either case the READ routine will be called, 400(5) or 400(4) to read entry No. 4 that is the dimension ax. The X-coordinate of true point or of the reference point (when not in core table) is recalculated (355 or 357) on that basis, and the program proceeds to READ 400(6), or 400(7). This READ subroutine will return entry No. 5 which is the second object point and the program continues along 346-yes.

For the operation to work properly, it is required that the second object point must not be already in the point table. The condition is readily fulfilled as not both of the object points must be "old" so that at least the second one can readily be chosen to be the new one. Hence, the program proceeds to 343-no and from there to 356 wherein now the X-coordinate value of the second object point is replaced by the X-coordinate of the reference point.

The READ subroutine called next is 400(4) and will return the dimension ay, 345-yes. The Y-coordinate of the second object point is now recalculated by operation 357; Y-coordinate of the reference point (that is the previous point in the array for this operation) plus (or minus) dimension ay as just returned. The program branch may exit via 369 which includes inhibition of copying of the flag-marked reference point into I-core table as well as into the point table.

Any unit or any item that has been inserted can be eliminated with the understanding that with the elimination of a unit, all items pertaining to that unit are likewise eliminated. Also, all qualitative and quantitative descriptors associated with such unit or item are eliminated therewith. The deletion is done the same way as the insertion as far as user operation is concerned, as each unit or item can be inserted as well as deleted. The format of storage, however, is somewhat different in the overlay table. The I-code for all deletions is e.g., 3, and the appended code, as a kind of describing number, is the identification code of the item or unit to be deleted. The Q2 portion of the Q register holds the I-code proper of the item to be deleted.

The detected I-code "3" may be returned by any READ and the program will loop through 317, or the deletion code is returned by READ 400(1) itself and the program branches to 390-yes. As per 391, the I-code of the unit or item to be deleted is taken from Q2 and the routine proceeds to 392 and/or 393 for detection whether an item or a unit is to be eliminated. As per 394, the current I-core table is searched for the item, and if not found, the scratch file is searched for as per 395. After having found the item, it is erased from wherever it was found. Also, the point table is updated by reducing the point use count of the respective plan points (or deleting the plan points under the item), whereupon the program returns to 317.

In case of unit deletion, it is tested at 398 whether the unit to be deleted is the current one; if so the EOUF maker is simply reset (box 399). If not current, the scratch file is searched, and the unit eliminated therefrom.

These operations are described in a somewhat simplified manner. It is understood that an item code or an unit code does not identify per se a single item or a single unit completely. Particularization for each I-code is by use of plan points. Therefore, for deletion of a wall (a unit) the corner points of the wall must be touched also, only then is the wall to be deleted and sufficiently defined. The search for the particular unit (or item) includes preliminarily the acquisition of plan points and any item or unit is then searched made on that basis. Therefore, utilization of program branch 340-yes (FIG. 3c) is part of the search operations, whereby through suitable flag settings, the insertion of such points in the point table is inhibited.

The deletion is mentioned here only by way of example and summarily as part of permissible correction procedures; they do not form an essential part of the invention.

RESULT AND FURTHER USE

As was outlined above, the program called the input program compiles a record in the master file which is composed of sequential words. Such a record is typically, composed of "unit records," each such unit record being completed in the I-code table. The unit record begins with a word that is a unit code. In the example we have used repeatedly, compiling of data relevant to construction drawings, there will be several records which begin with an identification code word for "wall" followed by qualitative descriptors, such as interior or exterior, first or second story, etc. Next the location of the wall will be described and particularized as a wall. This location description is comprised of at least two location descriptors 1401, each followed by a word for the X-coordinate followed in turn by a word by the Y-coordinate. The two location coordinate pairs may have been very accurately defined by alignment and distance adjustment. These words may be followed by a height-descriptor I-code followed by a number word that is the height. It can readily be seen, that now there is made a record of a planar representation, having geometry significance transverse to the plane in the plan area: The two end points of a wall are defined in the plan area, and the height transverse thereto is the following one number descriptor plus height-defining number. Moreover, each length value has been (or could have been) defined at any desired degree of accuracy; if for example, all dimensions are calculated with one-eighth inch as smallest unit, and if the drawing in the plan area was on a 100:1 scale, clearly the accuracy of any length dimension, is made greater by digitally defining the dimension via the "keyboard" rather than relying on plan area pointing alone. Next, items of that wall, such as windows, may be described beginning with an item code describing a window followed by location description and height description, etc.

The master file, therefore, is comprised of such word sequences usually alternating between identification codes followed by qualitative descriptors, location descriptors and quantitative descriptor, each followed by the respective describing numbers. In the following, it shall be briefly described what use can be made of such a record.

With this we turn to FIG. 7. A program is described therein only summarily, to indicate the usefulness of such a compiled record. The program begins with the usual setup block 501. The next statement 502 refers to a search and copy routine in which all data from one unit are read into core memory. The copying process goes from unit code to unit code. In particular, all of the descriptors of a wall are being so copies. Next there is an inquiry whether all units have been so read from the master file (503) thereafter a wall analysis begins.

The analysis begins for example, with getting the I-descriptor code that gives the stud spacing and after having found that code (box 504), the numerical value of the stud spacing is extracted from the record now in core. The program then proceeds, (box 505) in generating location points beginning with the coordinate value of one corner of the wall and incrementing same in units of stud spacing and providing digital representation (location coordinate pairs) for each stud to be spaced until having reached the other end of the wall.

Next, the record is searched if there is to be any opening (box 506) in the wall, and it may be assumed that this is the case. The coordinates of the opening are ascertained and compared with the stud placement points just generated. One of the coordinate values for the window placement and location is now changed and the other one is changed correspondingly to align the window with one of the studs (box 507). This is an option and is not essential but it demonstrates that the program can be used to modify slightly the construction for economization In block 508 the studs that have been placed in the several locations, as per box 505, are now eliminated within the window or door area and if it is a window so-called cripples are substituted below the windowsill and above the header (box 509). Next, representation is made that a trimmer being placed (510). Usually a trimmer is a stud that supports the header from below. As per box 511, it is determined whether this wall is to be load-bearing and that has a bearing on selection of the header. As per box 512, the header is determined; thereafter the program goes back to search for additional openings.

If all the various openings have been processed, the program searches the record to see that there is an indication that at a particular point a partition or interior wall is to terminate. If that is so, extra studs are being placed through generation of appropriate location descriptors, box 513. Next, representation within this coordinate system for placement of mudsill and of a top plate are provided.

It should be mentioned that in case the drawing includes side elevations, placement of these items could be keyed in in the same way the wall is keyed in in a top elevation, but this is not necessary, and the user program processing a particular wall may merely supply this additional information because the data provided up to that point are sufficient for automatic generation of these additional placements. For example, the mudsill is as long as the wall is long. The same is true for the first top plate but there are additional top plates with spacings wherever partitions terminate at that particular wall.

Having completed these operations, the program returns to get the next wall information, etc. After all units for the walls program, i.e., all walls have been so processed, the program branches as per 515 and correlates the various items with a stored materials table: Each item e.g., stud, trimmer, sills, etc. is now appropriately identified. This part of the program simply correlates the qualitative material requirements that go with such qualitative description, or, for example, pursuant to this program portion codes are generated which require that some of these parts be made of white fir, or Douglas fir, or of other special material. Having done that, as per statement 516, a materials list is compiled, giving quantities or totalling particular length; for example, for that particular wall so many studs of special material and of particular length are needed, so many headers of one size or another, so many top sills, so many plates, etc. This part of the program may complete the total list in terms of cubic feet, etc. of wood. Finally, a special compilation of all locations of studs and other items is compiled to enable a plotter to plot a graph. The program then continues to search the master file for the floors, etc. and other records. These do not have to be described but it is readily apparent that step for step the various units and item information is processed to generate the complete representation as to the requirements for such a building. It is also apparent that the essential part is presentation to the input program of locations that in effect define boundaries, and of dimensions to particularize these boundaries. The boundaries are to be understood as being sections through objects in any given plane, and once that location and dimension information is put in, it can be processed and put together in any desired form, which may vary greatly. In essence, then, geometric information is being quantitized to any desired degree but using the graphic representation as starting point upon using additional quantitive input, the required degree of accuracy can be supplemented, resulting in data that can have any degree of accuracy a to geometric relation, independently from the accuracy of the drawing that was used in the beginning.

The invention is not limited to the embodiments described above but all changes and modifications thereof not constituting departures from the spirit and scope of the invention are intended to be included.

The appended printout is a statement list in Fortran IV, printed by an IBM 1130 and representing a complete input program of which the above is a summary flow chart. Most designations are similar except that TAPE and READ are respectively called CODE and BLOCK in the list of sub-routines.

We claim:

1. A method for processing signals representing coordinate values of points in a graphic input tablet, using a stored program, digital data processing facility receiving the signals or representation of such signals, the facility having storage means for storing signals to be processed and having processing means to process signals as stored in the storage means, comprising the steps of:

generating first representations for generated coordinate values of plan points in a first particular area of said tablet where points within the first particular area are identified as points of geometric significance;

generating second representations for generated coordinate values of plan points in a second particular area of the tablet where the points within the second particular area are identified with descriptive codes;

generating third representations for generated coordinate values of plan points in a third particular area of the tablet where the points within the third particular area are identified with numerical significances;

providing a first data table in the storage means, the first data table having representations associating the coordinate values of particular discrete points in the second particular area of the tablet with descriptive codes which are independent from each other and independent from any incidental geometric relation among the discrete points in the second area;

providing a second data table in the storage means, the second data table having representation associating the coordinate values of discrete points in the third particular area of the table with numerical significances which may be independent from each other and are independent of any incidental geometric relation among the points in the third particular area;

determining the respective descriptive code or codes from the generated coordinate values of each discrete point in the second particular area and from the first data table;

determining the number associated in the second table from the generated coordinate values of each generated point in the third particular area; and associating the determined descriptive codes in order relation to coordinate plan point or points generated in the first particular area of the tablet and in order relation to the generated coordinate values of points in the third particular area of the tablet;

associatively processing, in accordance with a particular order of generation of coordinate values of points in the first, second and third particular areas, the number determined from the second table in relation to coordinate representation determined from the first particular area and descriptive code determined from the first table.

2. A method as set forth in claim 1, wherein generated coordinate values of points in the third particular area, succeeding generated coordinate values of a point generated in the second particular area to represent a particular code of a particular class of codes in the first particular table, are processed by appending to the particular code the numbers representing the points generated in the third particular portion of the tablet.

3. A method as set forth in claim 1, wherein an algorithm is used to process coordinate values of points generated in a particular sequence in the first, second and third areas with at least two points defining in the first area a dimension of an object in a direction transverse to the first area by the distance between two points in one direction in the first area.

4. Method as in claim 1, including the step of including an algorithm to replace a point generated within a particular distance from the periphery of the first particular area by the coordinates of the point at the particular distance from the periphery of the first particular area and closest to the generated point.

5. Method as in claim 1, the detecting steps including an algorithm to determine minimum deviation of points generated in the first table in representation of particular descriptive codes from coordinate pairs of points respectively entered at particular discrete positions in the second particular area.

6. Method as in claim 1, including an algorithm to modify the geometric relation of sequentially generated points in the first area.

7. A method for processing signals representing coordinate values of points in a graphic input tablet, using a stored program, digital data processing facility receiving the signals or representation of such signals, the facility having storage means for storing signals to be processed and having processing means to process signals as stored in the storage means, comprising the steps of:

generating first representation for generated coordinate values of plan points in a first area of said tablet identifying the points as points of geometric significance within the first area;

providing a first data table in the storage means, having representation associating the coordinate values of particular discrete points in a second area of the tablet, outside of the first area, with descriptive codes, independently from each other and independent from any incidental geometric relation among the points in the second area;

detecting the respective descriptive code or codes as associated in the first table with the generated coordinate values of a point in the second area, and associating the detected code or codes in relation to coordinate plan point or points generated in the first area and in particular order relation to the generated coordinate values of points in the second area;

providing a second data table in the storage means having representation associating the coordinate values of particular, discrete points in a third area of the table, outside of the first area, with numbers, independent from any incidental geometric relation among the points in the third area;

detecting the number associated in the second table with the generated coordinate values of a point in the third area, and associatively processing the number so detected in relation to generated plan point coordinate representation or detected descriptive code, in dependence upon the order of presentation of coordinate values of points in the first, second and third areas, and using an algorithm wherein generated coordinate values of points in the third area, generated in particular order relation to generation of the coordinate values of a pair of plan points, are used to recalculate the coordinate values of at least one of the pair of plan points.

8. A method for processing signals representing coordinate values of points in a graphic input tablet, using a stored program, digital data processing facility receiving the signals or representation of such signals, the facility having storage means for storing signals to be processed and having processing means to process signals as stored in the storage means, comprising the steps of:

generating first representation for generated coordinate values of plan points in a first area of said tablet identifying the points as points of geometric significance within the first area;

providing a first data table in the storage means, having representation associating the coordinate values of particular discrete points in a second area of the tablet, outside of the first area, with descriptive codes, independently from each other and independent from any incidental geometric relation among the points in the second area;

detecting the respective descriptive code or codes as associated in the first table with the generated coordinate values of a point in the second area, and associating the detected code or codes in relation to coordinate plan point or points generated in the first area and in particular order relation to the generated coordinate values of points in the second area;

providing a second data table in the storage means having representation associating the coordinate values of particular, discrete points in a third area of the table, outside of the first area, with numbers, independent from any incidental geometric relation among the points in the third area;

detecting the number associated in the second table with the generated coordinate values of a point in the third area, and associatively processing the number so detected in relation to generated plan point coordinate representation or detected descriptive code, in dependence upon the order of presentation of coordinate values of points in the first, second and third areas, and using an algorithm operating in response to generation of points in the first and second areas to assemble the coordinate values of a plan point so defined in relation to an object identifying code and quantitative object description numbers taken from the first table and identifying the object to be located at said plan point.

9. Method as in claim 8, including an algorithm operating in response to additionally generated points in the third area to augment the quantitative description of the object on basis of the second table.

10. A method of operating a data processing system having a memory in response to data entered and representing coordinate values of points selected in a tablet having characteristics of generating signals representing the coordinate values of the selected points, comprising the steps of:

operating a first particular portion of the memory as a correlation table associating particular points in a first particular area of the tablet with codes representing individual numerical values;

operating a second particular portion of the memory as a correlation table associating particular points in a second particular area of the tablet within individual description codes;

operating a third particular portion of the memory as an accumulation table in which to assemble coordinate values of points entered in a third particular area of the tablet;

individually selecting in order particular points in the first, second and third particular areas of the tablet to obtain the generation of the coordinate values of the points selected; and providing a selection of the individual ones of the description codes, numerical values and coordinate values of points in the third area in accordance with an algorithm that depends on the order of selection of points in the first, second and third particular areas on the tablet.

11. A method as in claim 10, generating the correlation table in the first portion of memory by entering coordinate values in the table in a particular sequence and providing an algorithm that enters codes in association with the entered coordinate values on basis of sequence of entry.

12. A method as in claim 10, including, generating particular description codes from the correlation table in the second portion of the memory by sequentially associating coordinate values of points entered in the second particular area of the tablet with the content of the correlation table in the first particular area of the tablet on the basis of points entered in the first particular area of the tablet.

13. The method as in claim 10, preceded by placement of an overlay in at least one of the first and second particular areas of the tablet and entering alignment points in at least a particular one of the first and second particular areas of the tablet to determine the misalignment of the overlay in the particular one of the first and second particular areas of the tablet, the method including an algorithm to correct each point entered in at least the particular one of the first and second particular areas of the tablet in accordance with overlay misalignment before searching for correlation in memory.

14. The method as in claim 10, the last operating step including forming a program loop to receive sequentially in a preliminary table coordinate values entered in the third particular area of the tablet and correct the coordinate values in the preliminary table in accordance with numbers determined by the operation of the first memory portion upon detection of points entered in the first particular area of the tablet, and exiting from the loop upon encountering entry in the second particular area of the tablet of a point unrelated to the previous entries in the second particular area of the tablet.

15. A method of processing coordinate values of points entered in a tablet by means of a digital data processing facility, comprising the steps of:

operating a first particular portion of a tablet area as an alphanumerical keyboard by correlating discrete points entered in the first particular portion of the tablet area with keyboard numbers;

operating a second particular portion of the tablet as a description board for description codes by correlating discrete points entered in the second particular portion of the tablet area with arbitrarily selected description codes;

operating a third particular portion of the tablet area as a graph board for a spatial relationship by storing in the graph board values representing a spatial relationship corresponding to the spatial relationship of points entered in the third particular portion of the tablet area; and correlating keyboard numbers, description codes and graph board points respectively entered into the first, second and third particular portions of the tablet areas by means of an algorithm that operates in dependence upon the order of entry of points in the first, second and third particular portions of the tablet area.

16. The method as in claim 15, wherein the operation as to the first tablet area is preceded by placement of a keyboard overlay in the first tablet area and keying-in alignment points, the method including calculating corrective values between particular overlay points and coordinate values stored in association with keyboard numbers in the data processing facility.

17. The method as in claim 15, wherein the operation as to the second tablet area is preceded by placement of a description overlay in the second tablet area and keying-in alignment points, the method including calculating corrective values between particular overlay points and coordinate values stored in association with description coded in the data processing facility.

18. A method as set forth in claim 15, including the step of providing an algorithm for scaling distances defined by pairs of points entered in the third particular portion of the tablet area on the basis of keyboard numbers resulting from entry of points in the first particular portion of the tablet area.

19. A method as in claim 15, wherein coordinate values of points are separated in accordance with their entry into the first, second and third particular portions of the tablet area, and the coordinate values of the points entered respectively in the first and second particular portions of the tablet area are correlated with decimal numbers and description codes.

20. A method as set forth in claim 15, wherein an algorithm is provided to append keyboard numbers to description codes on the basis of a particular sequence of entry of points in the second and first particular portions of the tablet area.

21. A method as set forth in claim 15, including an algorithm defining the geometric relation of graph board points resulting from entry of points in the third particular portion of the tablet area on the basis of keyboard numbers resulting from points entered in the second particular portion of the tablet area.

22. A method as in claim 15, including an algorithm correlating a description code resulting from entry of a point in the second particular portion of the tablet area with a keyboard number resulting from subsequent entry of a point or points in the first particular portion of the tablet area.

23. A method as in claim 15, including an algorithm correlating a description code resulting from entry of a point in the second particular portion of the tablet area with a number tallied from a number of subsequent entries in the third particular portion of the tablet area.

* * * * *